United States Patent
Lei et al.

(10) Patent No.: US 12,295,003 B2
(45) Date of Patent: May 6, 2025

(54) CONFIGURED GRANT SMALL DATA TRANSFER RESPONSE TRANSMISSION AND UPLINK PRIORITY HANDLING

(71) Applicant: QUALCOMM Incorporated, San Diego, CA (US)

(72) Inventors: Jing Lei, San Diego, CA (US); Linhai He, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 17/450,869

(22) Filed: Oct. 14, 2021

(65) Prior Publication Data

US 2022/0124780 A1 Apr. 21, 2022

Related U.S. Application Data

(60) Provisional application No. 63/198,463, filed on Oct. 20, 2020.

(51) Int. Cl.
| | |
|---|---|
| *H04W 72/23* | (2023.01) |
| *H04L 1/1607* | (2023.01) |
| *H04L 5/00* | (2006.01) |
| *H04W 72/21* | (2023.01) |

(52) U.S. Cl.
CPC .......... *H04W 72/23* (2023.01); *H04L 1/1607* (2013.01); *H04L 5/0048* (2013.01); *H04W 72/21* (2023.01)

(58) Field of Classification Search
None
See application file for complete search history.

(56) References Cited

U.S. PATENT DOCUMENTS

| | | | |
|---|---|---|---|
| 11,470,488 B1* | 10/2022 | Babaei | H04W 76/27 |
| 2013/0016602 A1* | 1/2013 | Diachina | H04W 4/20 |
| | | | 370/336 |
| 2018/0123765 A1 | 5/2018 | Cao et al. | |

(Continued)

FOREIGN PATENT DOCUMENTS

| | | |
|---|---|---|
| EP | 3648542 A1 | 5/2020 |
| WO | WO-2020032634 A2 | 2/2020 |

OTHER PUBLICATIONS

Partial International Search Report—PCT/US2021/071908—ISA/EPO—Feb. 7, 2022.

(Continued)

*Primary Examiner* — Hassan A Phillips
*Assistant Examiner* — Gautam Sharma
(74) *Attorney, Agent, or Firm* — Harrity & Harrity, LLP

(57) ABSTRACT

Various aspects of the present disclosure generally relate to wireless communication. In some aspects, a user equipment (UE) may transmit uplink data to a base station in a configured grant small data transfer (CG-SDT) occasion in a CG-SDT occasion group associated with multiple UEs. The UE may receive a group common physical downlink control channel (GC-PDCCH) multiplexing CG-SDT feedback targeted to the multiple UEs associated with the CG-SDT occasion group. In some aspects, the CG-SDT feedback multiplexed in the GC-PDCCH includes CG-SDT feedback for the uplink data transmitted in the CG-SDT occasion. Numerous other aspects are provided.

24 Claims, 10 Drawing Sheets

(56) References Cited

U.S. PATENT DOCUMENTS

| | | | |
|---|---|---|---|
| 2018/0139651 A1* | 5/2018 | Kim | .......................... H04L 5/00 |
| 2019/0045489 A1 | 2/2019 | He et al. | |
| 2020/0221506 A1* | 7/2020 | Jeon | ................. H04W 74/0833 |
| 2021/0211994 A1* | 7/2021 | Shih | ...................... H04W 76/19 |
| 2021/0321413 A1 | 10/2021 | Shin et al. | |
| 2021/0410180 A1* | 12/2021 | Tsai | ................. H04W 72/1263 |
| 2021/0410181 A1* | 12/2021 | Jeon | ................. H04W 52/0258 |
| 2022/0007423 A1* | 1/2022 | Agiwal | ............. H04W 74/0833 |
| 2022/0046661 A1* | 2/2022 | Jeon | ....................... H04W 72/23 |
| 2022/0046749 A1* | 2/2022 | Lin | ...................... H04W 76/30 |
| 2022/0078697 A1* | 3/2022 | Tseng | ................... H04W 48/06 |
| 2022/0124520 A1* | 4/2022 | Lin | ...................... H04W 72/23 |
| 2022/0210868 A1* | 6/2022 | Park | ................. H04W 28/0278 |

OTHER PUBLICATIONS

International Search Report and Written Opinion—PCT/US2021/071908—ISA/EPO—Apr. 7, 2022.

* cited by examiner

CONFIGURED GRANT SMALL DATA TRANSFER RESPONSE TRANSMISSION AND UPLINK PRIORITY HANDLING

CROSS-REFERENCE TO RELATED APPLICATION

This Patent Application claims priority to U.S. Provisional Patent Application No. 63/198,463, filed on Oct. 20, 2020, entitled "PRECONFIGURED UPLINK RESOURCE RESPONSE TRANSMISSION AND UPLINK PRIORITY HANDLING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for configured grant small data transfer (CG-SDT) response transmission and uplink priority handling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting uplink data to a base station in a configured grant small data transfer (CG-SDT) occasion in a CG-SDT occasion group associated with multiple UEs; and receiving a group common physical downlink control channel (GC-PDCCH) multiplexing CG-SDT feedback targeted to the multiple UEs associated with the CG-SDT occasion group, wherein the CG-SDT feedback multiplexed in the GC-PDCCH includes CG-SDT feedback for the uplink data transmitted in the CG-SDT occasion.

In some aspects, a method of wireless communication performed by a base station includes receiving, from a UE, uplink data in a CG-SDT occasion in a CG-SDT occasion group associated with multiple UEs; and transmitting a GC-PDCCH multiplexing CG-SDT feedback targeted to the multiple UEs associated with the CG-SDT occasion group, wherein the CG-SDT feedback multiplexed in the GC-PDCCH includes CG-SDT feedback for the uplink data transmitted by the UE in the CG-SDT occasion.

In some aspects, a UE for wireless communication includes a memory and one or more processors coupled to the memory, the memory including instructions executable by the one or more processors to cause the UE to: transmit uplink data to a base station in a CG-SDT occasion in a CG-SDT occasion group associated with multiple UEs; and receive a GC-PDCCH multiplexing CG-SDT feedback targeted to the multiple UEs associated with the CG-SDT occasion group, wherein the CG-SDT feedback multiplexed in the GC-PDCCH includes CG-SDT feedback for the uplink data transmitted in the CG-SDT occasion.

In some aspects, a base station for wireless communication includes a memory and one or more processors coupled to the memory, the memory including instructions executable by the one or more processors to cause the base station to: receive, from a UE, uplink data in a CG-SDT occasion in a CG-SDT occasion group associated with multiple UEs; and transmit a GC-PDCCH multiplexing CG-SDT feedback targeted to the multiple UEs associated with the CG-SDT occasion group, wherein the CG-SDT feedback multiplexed in the GC-PDCCH includes CG-SDT feedback for the uplink data transmitted by the UE in the CG-SDT occasion.

In some aspects, a non-transitory computer-readable medium stores one or more instructions for wireless communication, and the one or more instructions, when executed by one or more processors of a UE, cause the UE to: transmit uplink data to a base station in a CG-SDT occasion in a CG-SDT occasion group associated with multiple UEs; and receive a GC-PDCCH multiplexing CG-SDT feedback targeted to the multiple UEs associated with the CG-SDT occasion group, wherein the CG-SDT feedback multiplexed in the GC-PDCCH includes CG-SDT feedback for the uplink data transmitted in the CG-SDT occasion.

In some aspects, a non-transitory computer-readable medium stores one or more instructions for wireless communication, and the one or more instructions, when executed by one or more processors of a base station, cause the base station to: receive, from a UE, uplink data in a CG-SDT occasion in a CG-SDT occasion group associated with multiple UEs; and transmit a GC-PDCCH multiplexing CG-SDT feedback targeted to the multiple UEs associated with the CG-SDT occasion group, wherein the CG-SDT feedback multiplexed in the GC-PDCCH includes CG-SDT feedback for the uplink data transmitted by the UE in the CG-SDT occasion.

In some aspects, an apparatus for wireless communication includes means for transmitting uplink data to a base station in a CG-SDT occasion in a CG-SDT occasion group associated with multiple apparatuses; and means for receiving a GC-PDCCH multiplexing CG-SDT feedback targeted to the multiple apparatuses associated with the CG-SDT occasion group, wherein the CG-SDT feedback multiplexed in the GC-PDCCH includes CG-SDT feedback for the uplink data transmitted in the CG-SDT occasion.

In some aspects, an apparatus for wireless communication includes means for receiving, from a UE, uplink data in a CG-SDT occasion in a CG-SDT occasion group associated with multiple UEs; and means for transmitting a GC-PDCCH multiplexing CG-SDT feedback targeted to the multiple UEs associated with the CG-SDT occasion group, wherein the CG-SDT feedback multiplexed in the GC-PDCCH includes CG-SDT feedback for the uplink data transmitted by the UE in the CG-SDT occasion.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
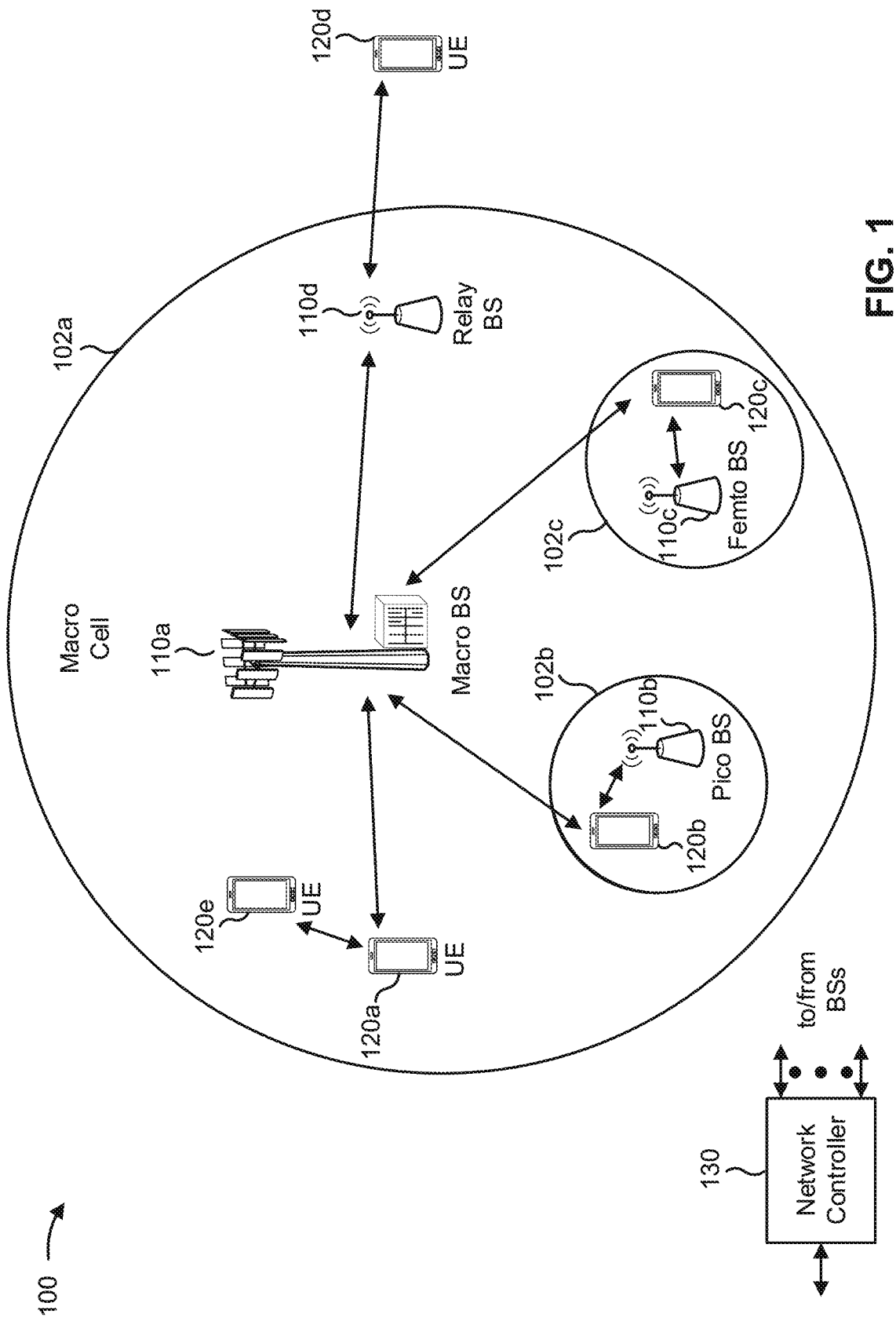
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FRE and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
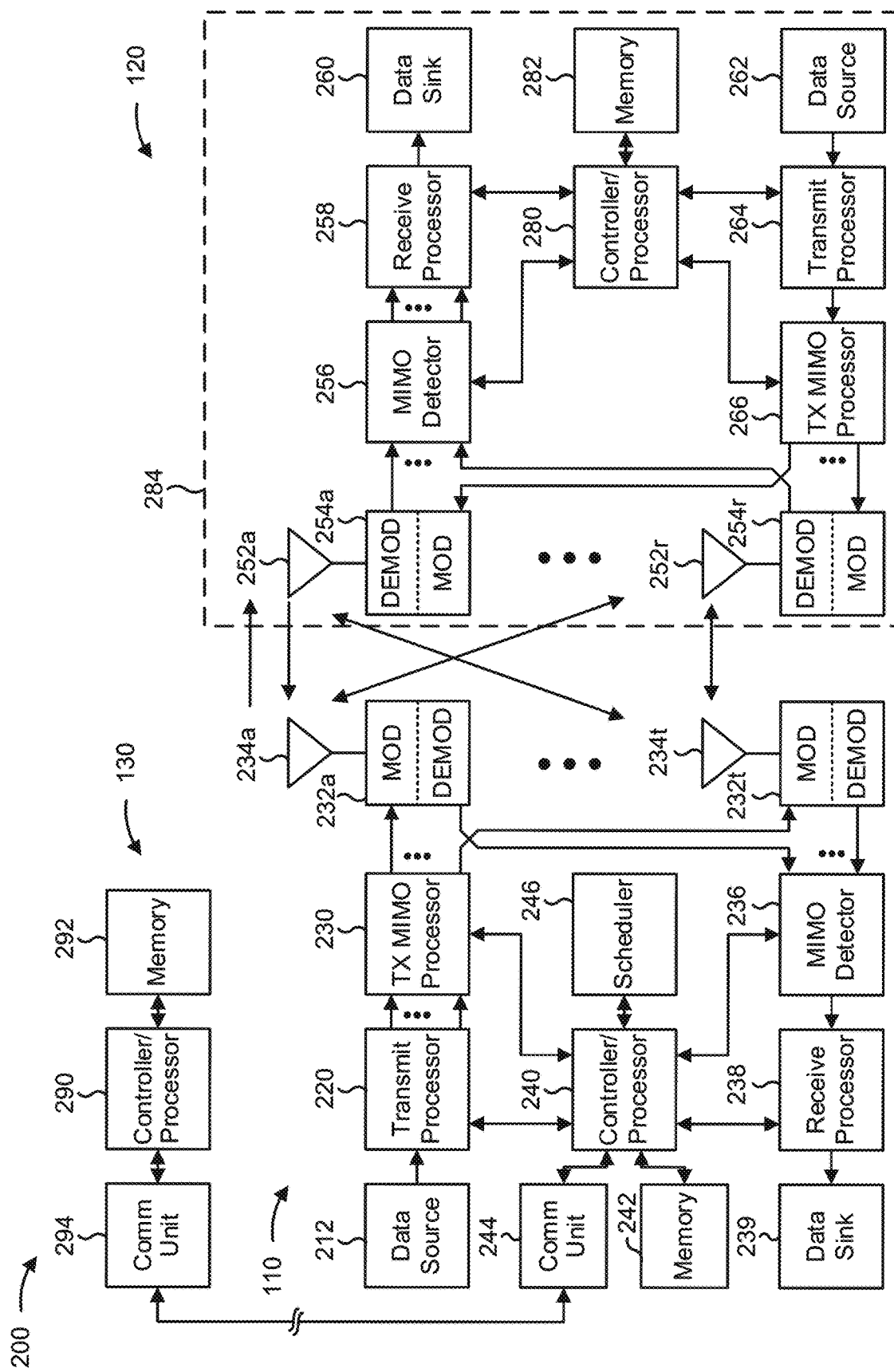
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234$a$ through 234$t$, and UE 120 may be equipped with R antennas 252$a$ through 252$r$, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232$a$ through 232$t$. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232$a$ through 232$t$ may be transmitted via T antennas 234$a$ through 234$t$, respectively.

At UE 120, antennas 252$a$ through 252$r$ may receive the downlink signals from base station 110 and/or other base stations and may provide received signals to demodulators (DEMODs) 254$a$ through 254$r$, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254$a$ through 254$r$, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234$a$ through 234$t$ and/or antennas 252$a$ through 252$r$) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254$a$ through 254$r$ (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-8).

Controller/processor 240 of base station 110, controller/processor 280 of UE 120, and/or any other component(s) of FIG. 2 may perform one or more techniques associated with configured grant small data transfer (CG-SDT) response transmission and uplink priority handling, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE 120 includes means for transmitting uplink data to a base station in a CG-SDT occasion in a CG-SDT occasion group associated with multiple UEs 120, and/or means for receiving a group common physical downlink control channel (GC-PDCCH) multiplexing CG-SDT feedback targeted to the multiple UEs 120 associated with the CG-SDT occasion group, wherein the CG-SDT feedback multiplexed in the GC-PDCCH includes CG-SDT feedback for the uplink data transmitted in the CG-SDT occasion. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for decoding scheduling information included in the GC-PDCCH to determine a mapping to a CG-SDT response message based at least in part on the CG-SDT feedback including an acknowledgement (ACK) for the uplink data transmitted in the CG-SDT occasion, and/or means for receiving the CG-SDT response message based at least in part on the scheduling information and the mapping between the ACK and the CG-SDT response message.

In some aspects, the UE 120 includes means for determining that a CG-SDT transmission conflicts with one or more other uplink transmissions based at least in part on an overlap between a CG-SDT and one or more other uplink transmissions, wherein the one or more other uplink transmissions include a PUCCH transmission or an SRS transmission, means for determining, among the CG-SDT transmission and the one or more other uplink transmissions, an uplink transmission that has a highest priority, and/or means for transmitting the uplink transmission that has the highest priority.

In some aspects, the UE 120 includes means for determining that a CG-SDT transmission and a PUCCH transmission conflict based at least in part on an overlap between a CG-SDT and a PUCCH resource, means for multiplexing the CG-SDT transmission with an uplink control information (UCI) payload associated with the PUCCH; and/or means for transmitting the CG-SDT transmission with the multiplexed UCI payload.

In some aspects, the UE 120 includes means for determining an occasion in which to retransmit the uplink data based at least in part on a timing advance validation and the CG-SDT feedback including a negative acknowledgement (NACK) for the uplink data transmitted in the CG-SDT occasion, and/or means for retransmitting the uplink data with a valid timing advance, wherein the determined occasion is a CG-SDT occasion or a retransmission granted by the CG-SDT feedback.

In some aspects, the UE 120 includes means for attempting the timing advance validation based at least in part on evaluating a timing advance timer and applying a timing advance command in the CG-SDT response message.

In some aspects, the base station 110 includes means for receiving, from the UE 120, uplink data in a CG-SDT occasion in a CG-SDT occasion group associated with multiple UEs 120, and/or means for transmitting a GC-PDCCH multiplexing CG-SDT feedback targeted to the multiple UEs 120 associated with the CG-SDT occasion group, wherein the CG-SDT feedback multiplexed in the GC-PDCCH includes CG-SDT feedback for the uplink data transmitted by the UE 120 in the CG-SDT occasion. The means for the base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station 110 includes means for encoding scheduling information in the GC-PDCCH to indicate a mapping to a CG-SDT response message based at least in part on the CG-SDT feedback including an ACK for the uplink data transmitted in the CG-SDT occasion, and/or means for transmitting the CG-SDT response message based at least in part on the scheduling information and the mapping between the ACK and the CG-SDT response message.

In some aspects, the base station includes means for determining that a CG-SDT transmission conflicts with one or more other uplink transmissions based at least in part on an overlap between a CG-SDT and one or more of a PUCCH resource or an SRS resource, wherein the one or more other uplink transmissions include a PUCCH transmission or an SRS transmission, means for determining, among the CG-SDT transmission and the one or more other uplink transmissions, an uplink transmission that has a highest priority, and/or means for receiving, from the UE, the uplink transmission that has the highest priority.

In some aspects, the base station includes means for determining that a CG-SDT transmission and a PUCCH transmission conflict based at least in part on an overlap between a CG-SDT and a PUCCH resource, and/or means for receiving, from the UE, the CG-SDT transmission multiplexed with an uplink control information payload associated with the PUCCH transmission.

In some aspects, the base station includes means for determining an occasion in which the UE is to retransmit the uplink data based at least in part on a timing advance validation and the CG-SDT feedback including a negative acknowledgement (NACK) for the uplink data transmitted in the CG-SDT occasion, and/or means for receiving, from the UE, a retransmission of the uplink data in the determined occasion based at least in part on the CG-SDT feedback including the NACK for the uplink data transmitted in the CG-SDT occasion, wherein the determined occasion is a random access channel (RACH) occasion supporting early data transmission, or a next CG-SDT occasion in the CG-SDT occasion group.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
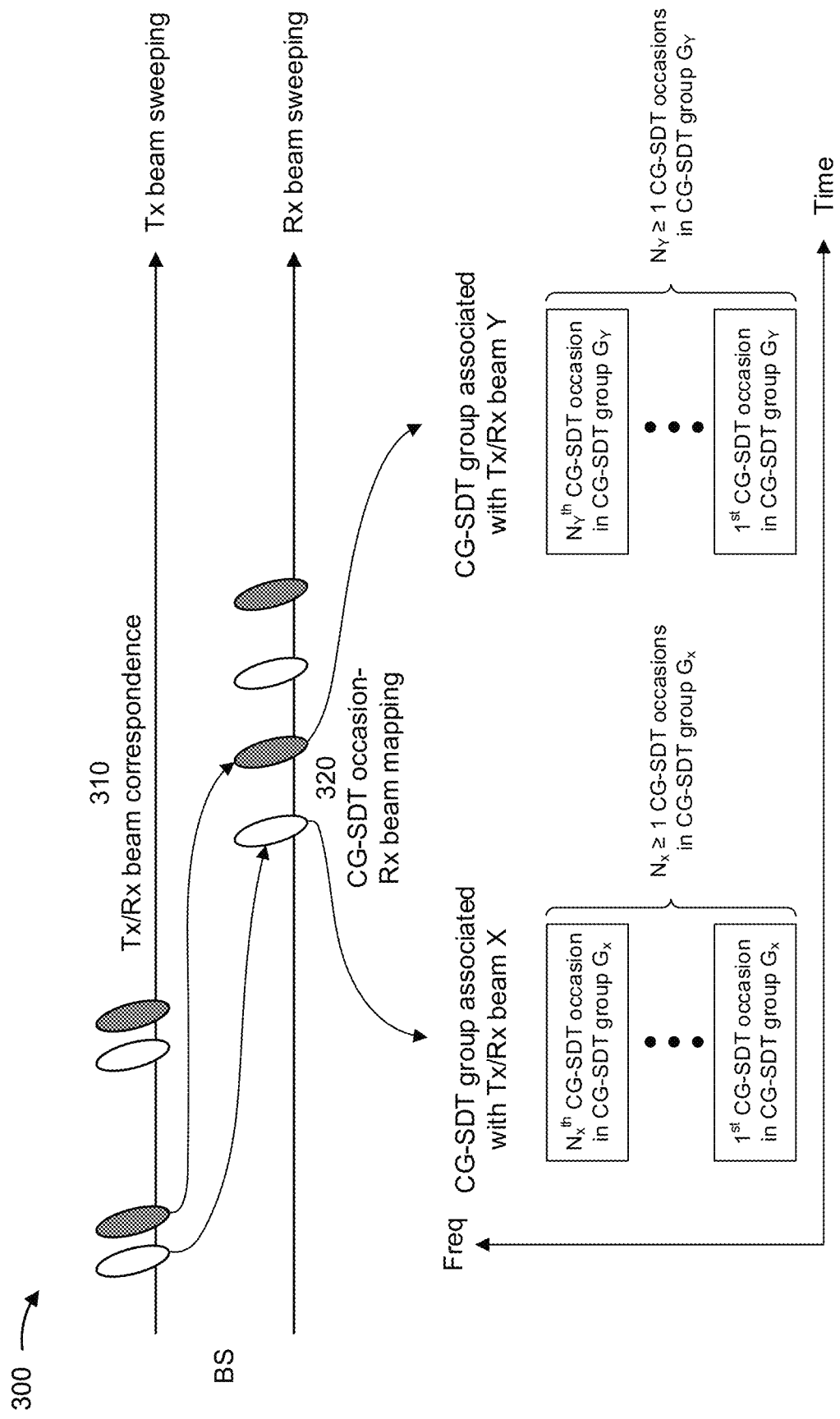
FIG. 3 is a diagram illustrating an example of a beam association for a configured grant small data transfer (CG-SDT) occasion group, in accordance with the present disclosure.

FIG. 3 is a diagram illustrating an example 300 of a beam association for a CG-SDT occasion group, in accordance with the present disclosure.

In a wireless network, such as an NR network or an LTE network, a UE may transmit uplink data using an uplink resource that was previously configured by a network (e.g., by a base station 110). For example, in an LTE network, the previously configured uplink resource may be referred to as a preconfigured uplink resource (PUR), which can generally be used to support a one-step uplink access procedure for connected mode or idle mode UEs with a valid timing advance (e.g., stationary or low-mobility UEs). Accordingly, a PUR may allow a UE in a radio resource control (RRC) idle state to transmit uplink data (e.g., control plane data and/or user plane data) in a first message between the UE and the base station, thereby enabling grant-free uplink data transmission, which improves uplink transmission efficiency and/or power consumption, among other examples. Furthermore, in an NR network, the previously configured uplink resource may be referred to as a configured grant small data transfer (CG-SDT), which may be applicable to a UE in an RRC inactive or idle state, associated with a beam-specific resource configuration, and associated with beam-specific feedback (e.g., a PDCCH and/or a physical downlink shared channel (PDSCH) that is quasi co-located (QCLed) with a downlink reference signal, such as a synchronization signal block (SSB) or tracking reference signal (TRS)). The use of a PUR and/or a CG-SDT may be particularly useful for MTC UEs, IoT UEs, and/or reduced capability (RedCap) UEs that may have relaxed peak throughput, latency, reliability, and/or other requirements relative to premium or reference UEs (e.g., by allowing a grant-free uplink transmission to occur while the UE is in an RRC idle state, an RRC inactive state, and/or another power-saving state). Although some aspects described herein relate to CG-SDT response transmission and/or uplink priority handling, it will be appreciated that the same or similar techniques may be used for PUR response transmission and/or uplink priority handling. Similarly, aspects related to PUR response transmission and/or uplink priority handling may be used for CG-SDT response transmission and/or uplink priority handling.

In some aspects, a base station may configure a CG-SDT for a UE while the UE is in an RRC connected state, when transmitting an RRC release message to the UE, and/or in a downlink message associated with a random access channel (RACH) procedure, among other examples. In some aspects, a CG-SDT may be configured as a dedicated CG-SDT and/or a contention-free dedicated CG-SDT, a contention-free shared CG-SDT, and/or a contention-based shared CG-SDT, among other examples. Furthermore, in some aspects, a base station may configure one or more CG-SDT occasion groups in a time domain, a frequency domain, and/or a spatial domain for one or multiple UEs (e.g., with different DMRS cyclic shifts for resolving contention). For example, in an NR network or another wireless network that uses beamformed communication, each CG-SDT occasion group may include one or more CG-SDT occasions that are associated with a beamformed downlink reference signal (e.g., an SSB and/or a channel state information reference signal (CSI-RS)). Furthermore, in a CG-SDT occasion group, a downlink transmit beam that the base station uses to transmit the beamformed downlink reference signal may have a correspondence with an uplink receive beam that the base station uses to receive a CG-SDT transmission from a UE associated with the CG-SDT occasion group.

For example, as shown by reference number 310, a base station may transmit one or more downlink reference signals (e.g., SSBs, CSI-RSs, and/or the like) in a transmit beam sweep, where different shadings in FIG. 3 represent different beam directions. Accordingly, based at least in part on measurements associated with the downlink transmit beams, a UE may indicate a best downlink beam (e.g., a beam having a highest RSRP measurement) to the base station, which may map to a CG-SDT occasion group that is associated with a corresponding uplink receive beam. For example, as shown by reference number 320, a first CG-SDT group (shown as CG-SDT group $G_x$) may include $N_x$ CG-SDT occasions associated with a first downlink transmit beam and a corresponding uplink receive beam (collectively shown as Tx/Rx beam X), where $N_x$ is an integer that has a value greater than or equal to one (1). Additionally, as further shown by reference number 320, a second CG-SDT group (shown as CG-SDT group $G_Y$) may include $N_Y$ CG-SDT occasions associated with a second downlink transmit beam and a corresponding uplink receive beam (collectively shown as Tx/Rx beam Y), where $N_Y$ is an integer that has a value greater than or equal to one (1).

Accordingly, in some aspects, the base station may use the uplink receive beam corresponding to the first downlink transmit beam to receive CG-SDT transmissions from the UE(s) in the first CG-SDT group, which includes one or more dedicated and/or shared CG-SDT occasions, and the base station may use an uplink receive beam corresponding to the second downlink transmit beam to receive CG-SDT transmissions from each UE in the second CG-SDT group, which includes one or more dedicated and/or shared CG-SDT occasions.

In some aspects, the base station may periodically configure the CG-SDT occasions based at least in part on one or more lookup tables or closed-form formulas, which may be parameterized according to a CG-SDT occasion periodicity (e.g., in slots and/or subframes), a slot and/or symbol offset of the CG-SDT occasions (e.g., in a subcarrier spacing of an active uplink bandwidth part), and/or a time duration of the CG-SDT occasions. Furthermore, when CG-SDT occasions are associated with SSB beams, a CG-SDT-to-SSB association period and/or association pattern period may be defined to ensure a uniform mapping of CG-SDT occasions to different corresponding uplink receive beams. For example, one CG-SDT-to-SSB association pattern period can include one or more CG-SDT-to-SSB association periods, one CG-SDT-to-SSB association period can include one or more CG-SDT configuration periods, and one CG-SDT configuration period can be an integer multiple of an SSB burst period. Similar mappings may also apply when CG-SDT occasions are associated with periodic CSI-RS beams.

In general, after a UE transmits a CG-SDT message that includes uplink data in a CG-SDT occasion configured for the UE (e.g., while in an idle or inactive state), the base station may transmit a PDCCH that includes feedback for the uplink data transmission. For example, the feedback may include an ACK to indicate that the base station received the CG-SDT message and was able to successfully decode the uplink data. Alternatively, the feedback may include a NACK to indicate that the base station did not receive the CG-SDT message and/or was unable to decode the uplink data. However, the PDCCH that carries the feedback for the CG-SDT transmission is targeted to a single UE. Accordingly, even though CG-SDT occasions can be configured and managed as a group, the base station has to configure and transmit a separate PDCCH to each UE that is associated with a CG-SDT configuration, which introduces additional signaling overhead.

Some aspects described herein relate to techniques and apparatuses to reduce the signaling overhead associated with CG-SDT response transmission and/or to enable a base station to transmit a CG-SDT response message to configure one or more communication parameters for a UE (e.g., while the UE is in an inactive or idle state). For example, in some aspects, a base station may receive uplink data transmissions in one or more CG-SDT occasions associated with a CG-SDT occasion group, and may transmit a group common PDCCH (GC-PDCCH) that includes feedback targeted to each UE associated with the CG-SDT occasion group. In this way, the base station may transmit one GC-PDCCH to indicate ACK/NACK feedback for each UE in a CG-SDT group, which reduces signaling overhead, conserves resources of the base station, and/or the like. Furthermore, in some aspects, the base station may transmit a CG-SDT response message that indicates one or more communication parameters (e.g., a timing advance command, a power control command, and/or the like), where the CG-SDT response message may be included in the GC-PDCCH, a PDSCH scheduled by the GC-PDSCH, and/or a combination thereof (e.g., a first portion of the CG-SDT response message may be included in the GC-PDCCH and a second portion of the CG-SDT response message may be included in the PDSCH scheduled by the GC-PDCCH). In this way, the UE may transmit uplink data while in a power-saving state, and the base station may use the CG-SDT response message to configure communication parameters to optimize performance of the UE while in the power-saving state. Furthermore, in cases where the CG-SDT response message configures an uplink resource that conflicts with (e.g., at least partially overlaps with) a CG-SDT, the UE may be configured to apply one or more conflict resolution rules to handle the conflicting uplink transmissions.

As indicated above, FIG. 3 is provided as an example. Other examples may differ from what is described with regard to FIG. 3.

Figure 4:
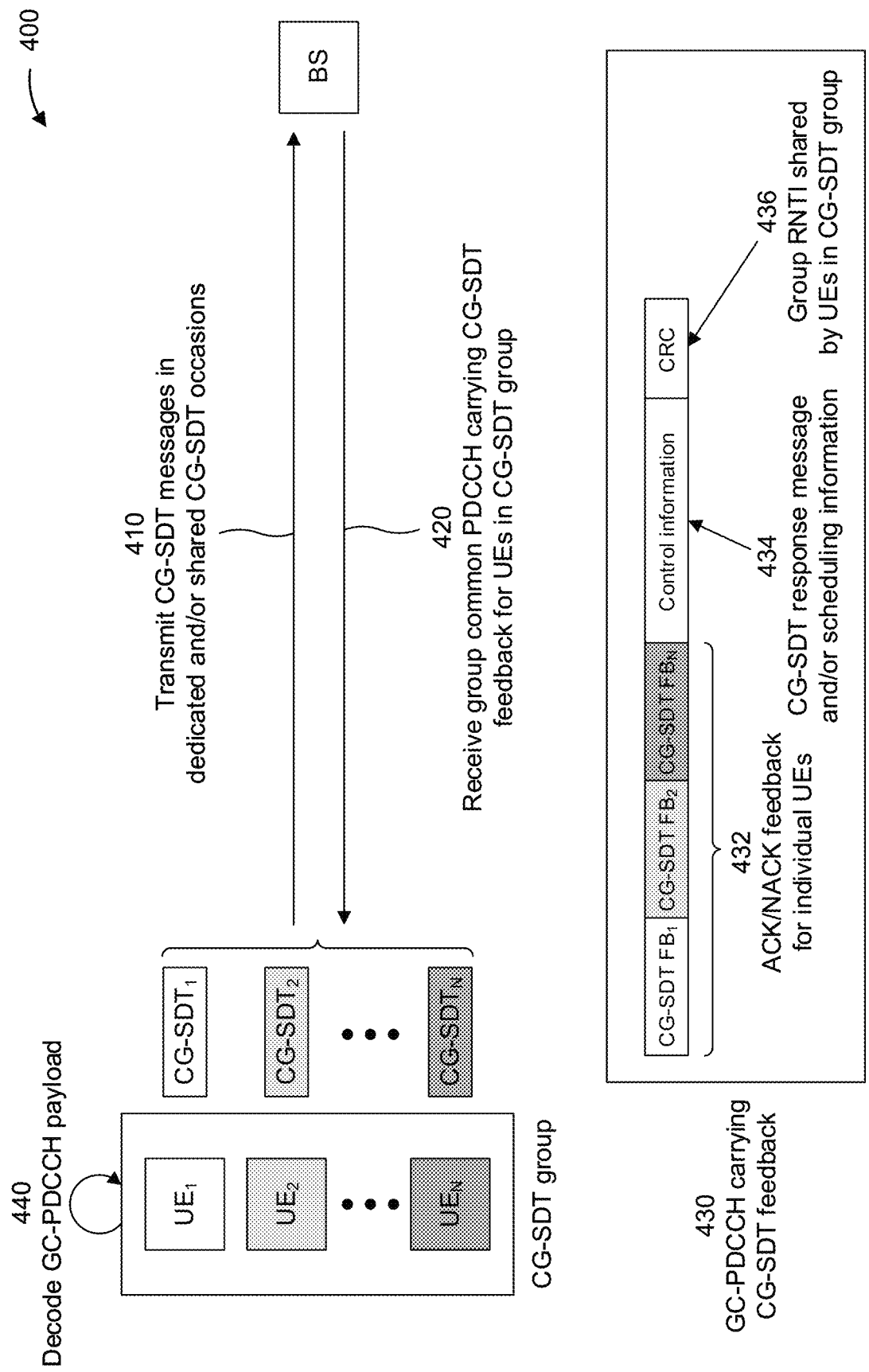
FIGS. 4-6 are diagrams illustrating examples associated with CG-SDT response transmission and uplink priority handling, in accordance with the present disclosure.

FIG. 4 is a diagram illustrating an example 400 associated with CG-SDT response transmission and uplink priority handling, in accordance with the present disclosure. As shown in FIG. 4, example 400 includes a base station (e.g., base station 110) that communicates with multiple UEs (shown as $UE_1$ through $UE_N$) in a wireless network (e.g., wireless network 100) via a wireless access link, which may include an uplink and a downlink. As further shown, the multiple UEs are associated with a CG-SDT group, whereby the UEs in the CG-SDT group may be configured to transmit uplink data in one or more dedicated and/or shared CG-SDT occasions in a CG-SDT occasion group (e.g., as described above with reference to FIG. 3). However, it will be appreciated that in other examples, the CG-SDT group may include only one UE (e.g., a CG-SDT group may generally include one or more UEs that are configured to transmit uplink data in one or more CG-SDT occasions associated with the CG-SDT group).

As shown in FIG. 4, and by reference number 410, one or more of the UEs in the CG-SDT group may transmit uplink data in a CG-SDT occasion associated with a CG-SDT occasion group that is configured for the UEs in the CG-SDT group (e.g., while the one or more UEs are in an idle or inactive state). For example, as described above, the base station may configure the CG-SDT occasions for the CG-SDT group when the UEs are in an RRC connected state, when transmitting an RRC release message to the UEs, and/or when transmitting a downlink message associated with a RACH procedure, among other examples. Furthermore, as described above, the base station may perform a transmit beam sweep associated with one or more downlink reference signals (e.g., using SSB beams, periodic CSI-RS beams, and/or the like). Accordingly, the base station and the UEs may perform a beam selection procedure to identify the best downlink transmit beam (e.g., a downlink transmit beam having a highest RSRP measurement), which is associated with a corresponding uplink receive beam that the base station uses to receive uplink data transmissions (e.g., control plane and/or user plane transmissions) from the UEs that are in a CG-SDT group associated with the same uplink receive beam. Accordingly, a CG-SDT occasion group that includes one or more CG-SDT occasions may be configured for the UEs in a particular CG-SDT group, and each UE that has uplink data to transmit may transmit the uplink data in one or more of the CG-SDT occasions in the configured CG-SDT occasion group. For example, in some aspects, the CG-SDT occasions in the configured CG-SDT occasion group may include dedicated CG-SDT occasions that are configured for individual UEs in the CG-SDT group and/or shared CG-SDT occasions that different UEs in the CG-SDT group can use to transmit uplink data to the base station. In this way, multiple UEs may be configured as a CG-SDT group to transmit uplink data using CG-SDT occasions in a CG-SDT occasion group, which may increase scheduling efficiency, resource efficiency, and/or the like.

As further shown in FIG. 4, and by reference number 420, the base station may transmit, and each UE that transmitted uplink data in a CG-SDT occasion may receive, a group common PDCCH (GC-PDCCH) that carries CG-SDT feedback for the respective uplink data transmissions. For example, in FIG. 4, $UE_1$ through $UE_N$ each transmit uplink data in a CG-SDT message (shown as $CG-SDT_1$ through $CG-SDT_N$) in a corresponding CG-SDT occasion, and the GC-PDCCH transmitted by the base station multiplexes CG-SDT feedback that is targeted to the UEs that transmitted the respective CG-SDT messages. For example, reference number 430 illustrates an example format for the GC-PDCCH, which includes multiplexed ACK/NACK feedback targeted to each individual UE, as shown by reference number 432. For example, the GC-PDCCH includes a first field (shown as $CG-SDT\ FB_1$) that includes ACK/NACK feedback for the CG-SDT transmission ($CG-SDT_1$) from $UE_1$, a second field (shown as $CG-SDT\ FB_2$) that includes ACK/NACK feedback for the CG-SDT transmission ($CG-SDT_2$) from $UE_2$, and an Nth field (shown as $CG-SDT\ FB_N$) that includes ACK/NACK feedback for the CG-SDT transmission ($CG-SDT_N$) from $UE_N$. In some aspects, the CG-SDT feedback fields may each include one (1) bit that may have a first value to indicate that the base station received and correctly decoded the corresponding CG-SDT transmission or a second value to indicate that the base station failed to receive and/or correctly decode the corresponding CG-SDT transmission. In this way, using the GC-PDCCH to multiplex the CG-SDT feedback targeted to multiple UEs in a CG-SDT group may reduce signaling overhead and/or increase efficiency relative to transmitting a PDCCH that includes CG-SDT feedback targeted to each individual UE.

Furthermore, in some aspects, the base station may use the GC-PDCCH to transmit and/or to schedule transmission of a short CG-SDT response message that includes one or more communication parameters for one or more of the UEs in the CG-SDT group. For example, as shown by reference number 434, the GC-PDCCH may include other control information (in addition to the ACK/NACK feedback for the CG-SDT transmissions by the individual UEs). In some aspects, the other control information included in the GC-PDCCH may include the short CG-SDT response message (or a portion of the CG-SDT response message) and/or information for scheduling a PDSCH that includes the short CG-SDT response message (or a remaining portion of the CG-SDT response message). For example, as described in more detail below with reference to FIG. 5, the scheduling information in the GC-PDCCH may include a downlink assignment (e.g., a resource allocation, a transport format, and/or other parameters) associated with the PDSCH that includes the CG-SDT response message (or a portion thereof). Accordingly, as described herein, the control information included in the GC-PDCCH may carry a short CG-SDT response message and/or schedule a PDSCH that includes a short CG-SDT response message, which may indicate one or more communication parameters for one or more UEs (e.g., a timing advance command, a power control command, an uplink grant for retransmitting the payload of the CG-SDT transmission (e.g., if the CG-SDT feedback is a NACK), an activation or a resource indication for a PUCCH and/or an SRS, configuration information for a wakeup signal, and/or configuration information for a TRS that may be used to update the timing advance for a UE).

As further shown by reference number 436, the GC-PDCCH may include a cyclic redundancy check (CRC) scrambled by a group radio network temporary identity (RNTI) shared by the UEs in the CG-SDT group. For example, when the base station configures the UEs in the CG-SDT group to use the dedicated and/or shared CG-SDT occasions in the same CG-SDT occasion group, the base station may additionally configure the UEs in the CG-SDT group with the group RNTI used to scramble the CRC of the GC-PDCCH. Accordingly, when the UEs transmit the CG-SDT messages that include the uplink data using the dedicated and/or shared CG-SDT occasions in the CG-SDT occasion group, the UEs may monitor a PDCCH for the GC-PDCCH with the CRC scrambled with the group RNTI. In some aspects, as further shown by reference number 440, each UE that transmitted a CG-SDT message may decode a payload of the GC-PDCCH based at least in part on detecting the GC-PDCCH with the CRC scrambled with the group RNTI.

For example, in some aspects, the base station may configure, for each UE in the CG-SDT group, an association that indicates a mapping to one of the fields that includes the ACK/NACK feedback for the CG-SDT transmission by the respective UE. Accordingly, based at least in part on detecting the GC-PDCCH with the CRC scrambled with the group RNTI, a UE may determine whether the CG-SDT feedback included in the GC-PDCCH for the respective UE indicates an ACK (meaning that the CG-SDT message transmitted by the UE was successfully received and decoded by the base station) or a NACK (meaning that the base station failed to receive and/or decode the CG-SDT message transmitted by the UE). In some aspects, where the CG-SDT feedback in the GC-PDCCH indicates a NACK for the CG-SDT message transmitted by the UE, the UE may determine an occasion in which to retransmit the CG-SDT message.

For example, a UE that receives NACK feedback for a CG-SDT message transmission may fallback to RACH-based early data transmission, in which case the CG-SDT message may be retransmitted in an occasion associated with a RACH procedure that supports early data transmission (e.g., a msg3 physical uplink shared channel (PUSCH) in a four-step RACH procedure, sometimes referred to as a type 1 RACH procedure, and/or a msgA PUSCH in a two-step RACH procedure, sometimes referred to as a type 2 RACH procedure). In some aspects, when a UE that receives NACK feedback for a CG-SDT message transmission falls back to RACH-based early data transmission, the UE may select a RACH type (e.g., a four-step or two-step RACH procedure) for the early data transmission based on RSRP measurements and/or other criteria that may be preconfigured by the base station (e.g., based on capabilities of the UE, latency or other performance requirements of the UE, and/or the like).

Additionally, or alternatively, a UE that receives NACK feedback for a CG-SDT message may attempt to validate a timing advance that is configured for the UE. For example, the timing advance may generally indicate an amount of time that the UE is to advance a CG-SDT transmission to ensure timely reception at the base station, based at least in part on a propagation delay between the UE and the base station. In general, when the base station configures the timing advance for the UE, the timing advance may be associated with a timer that indicates a duration that the timing advance is considered valid. Accordingly, in some aspects, the UE may determine that the timing advance is valid if the timer has not expired or may determine that the timing advance is no longer valid (such that the UE is to fallback to RACH-based early data transmission) if the timer has expired. Additionally, or alternatively, the UE may determine whether the timing advance is valid based at least in part on one or more position measurements. For example, the UE may transmit and/or receive one or more reference signals (e.g., an SRS, a positioning reference signal (PRS), and/or the like) to obtain observed time difference of arrival (OTDOA) measurements, and may determine whether a difference between a current position of the UE and a position of the UE when the timing advance was configured satisfies a threshold. Accordingly, if the change in the position of the UE satisfies the threshold, the propagation delay between the UE and the base station may differ from the propagation delay when the timing advance was configured, indicating that the timing advance is no longer valid. Alternatively, the UE may determine that the timing advance is still valid if the change in the position of the UE fails to satisfy the threshold. In some aspects, in cases where a UE that receives NACK feedback determines that the timing advance is valid, the UE may retransmit the CG-SDT payload in a next CG-SDT occasion. Otherwise, if the UE determines that the timing advance is invalid, the UE may fall back to RACH-based early data transmission and/or use other suitable techniques to retransmit the CG-SDT payload (e.g., entering an RRC connected mode).

Alternatively, in cases where the CG-SDT feedback included in the GC-PDCCH indicates an ACK for the CG-SDT message transmitted by a UE in the CG-SDT group, the UE may further decode scheduling information included in the GC-PDCCH to determine a mapping to a CG-SDT response message. For example, as described above, the base station may encode the GC-PDCCH to signal one or more communication parameters in a CG-SDT response message and/or may encode scheduling information in the GC-PDCCH to indicate a resource allocation and/or a transport format for a PDSCH that includes the CG-SDT response message. Accordingly, when a UE receives a GC-PDCCH that indicates ACK feedback for the CG-SDT message transmitted by the UE, the UE may further decode the control information included in the GC-PDCCH to determine the mapping to the CG-SDT response message that indicates one or more communication parameters for the UE, as described in more detail below.

As indicated above, FIG. 4 is provided as an example. Other examples may differ from what is described with regard to FIG. 4.

Figure 5:
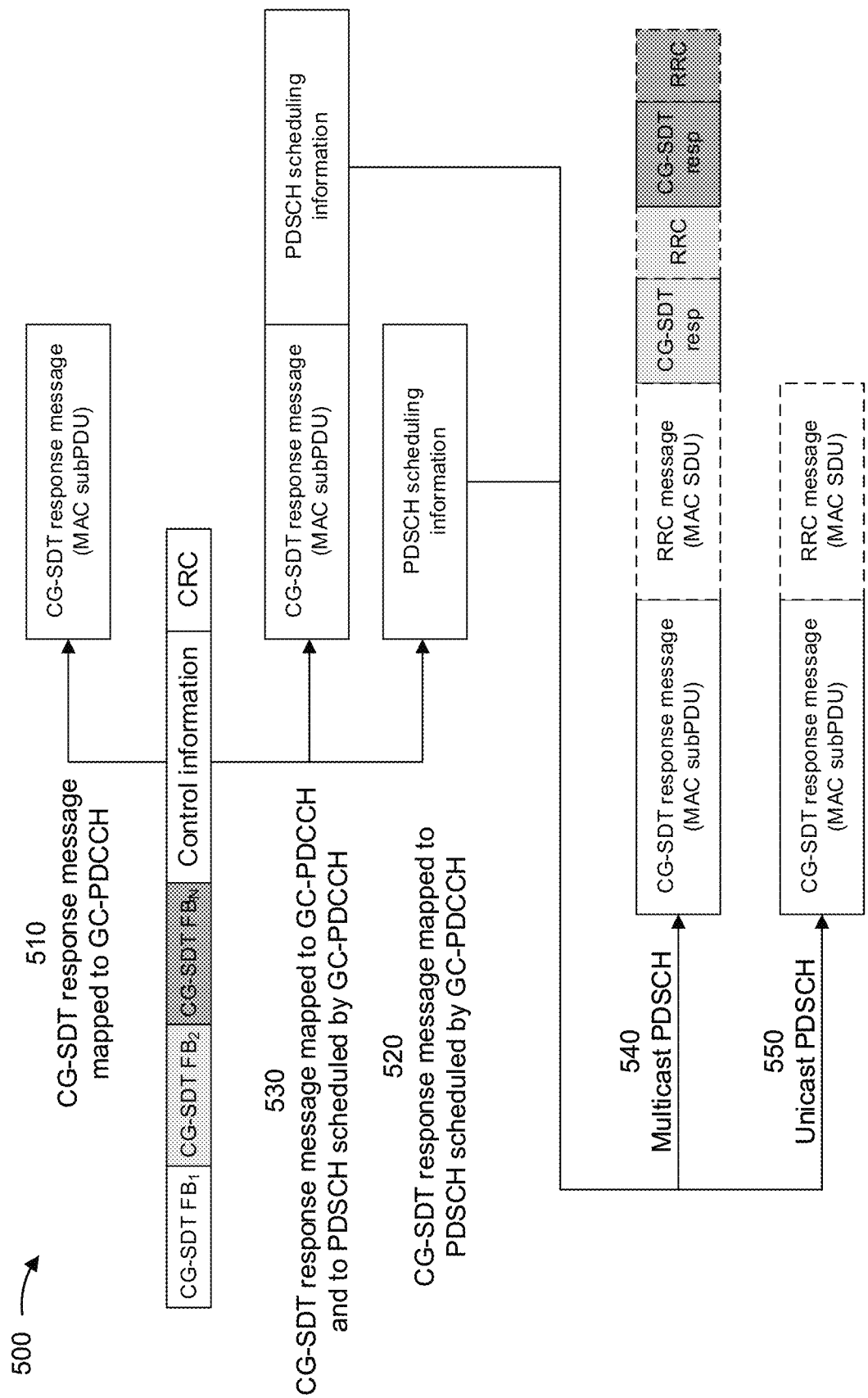

FIG. 5 is a diagram illustrating an example 500 associated with CG-SDT response transmission and uplink priority handling, in accordance with the present disclosure. As shown in FIG. 5, a base station may transmit, to one or more UEs in a CG-SDT group, a GC-PDCCH that carries ACK/NACK feedback targeted to the one or more UEs in the CG-SDT group. For example, as described above, the GC-PDCCH may include one or more CG-SDT feedback fields that are associated with respective UEs, whereby each UE that transmits uplink data in a CG-SDT occasion associated with a CG-SDT occasion group may monitor for the GC-PDCCH that includes a CRC scrambled by a group RNTI shared by the UE(s) in the CG-SDT group. Based at least in part on detecting the GC-PDCCH with the CRC scrambled by the shared group RNTI, the UE may determine whether the CG-SDT feedback field associated with the UE includes an ACK or a NACK for the CG-SDT message transmitted by the UE. In cases where the CG-SDT feedback indicates an ACK for the CG-SDT message transmitted by the UE, the UE may further decode control information included in the GC-PDCCH to determine a mapping to a CG-SDT response message that signals one or more communication parameters for the UE.

For example, as shown by reference number 510, the CG-SDT response message may be mapped to the GC-PDCCH, in which case the CG-SDT response message may be multiplexed with the one or more CG-SDT feedback fields that are associated with the respective UEs in the CG-SDT group. In some aspects, as described above, the CG-SDT response message may generally signal one or more communication parameters for a UE that transmitted a CG-SDT message successfully decoded by the base station. For example, in some aspects, the CG-SDT response message may include a timing advance command, a power control command, an uplink grant for retransmitting a payload of the CG-SDT in cases where the CG-SDT feedback is a NACK, an activation or a resource allocation for a PUCCH and/or an SRS, configuration information for a wakeup signal (e.g., a signal used to wake the UE(s) from the idle or inactive state in which the CG-SDT message is transmitted), and/or configuration information for a TRS (e.g., a reference signal used to update a configured timing advance). In some aspects, in cases where the CG-SDT response message is mapped to the GC-PDCCH (e.g., multiplexed with the CG-SDT feedback fields), the CG-SDT response message may target one UE or multiple UEs (e.g., the CG-SDT response message may indicate a communication parameter targeted to each UE in the CG-SDT group, such as a group common power control command). In some cases, however, the GC-PDCCH may have a relatively limited payload size that cannot fit at least a portion of the CG-SDT response message.

Accordingly, in some aspects, the CG-SDT response message and/or a portion of the CG-SDT response message that does not fit within the GC-PDCCH may be mapped to a PDSCH scheduled by the GC-PDCCH. For example, as shown by reference number 520, the CG-SDT response message may be mapped to a PDSCH scheduled by the GC-PDCCH, in which case the control information included in the GC-PDCCH may include scheduling information for the PDSCH (e.g., a resource allocation and/or transport format for the PDSCH that carries the CG-SDT response message). Additionally, or alternatively, as shown by reference number 530, the CG-SDT response message may include a first portion mapped to the GC-PDCCH and a second portion mapped to a PDSCH scheduled by the GC-PDCCH, in which case the control information included in the GC-PDCCH may include the first portion of the CG-SDT response message and scheduling information indicating the resource allocation and/or transport format for the PDSCH that includes the remaining portion of the CG-SDT response message.

In some aspects, in cases where the CG-SDT response message or a portion of the CG-SDT response message targeted to a particular UE is mapped to a PDSCH scheduled by the GC-PDCCH, the CG-SDT message may be multiplexed with an RRC message targeting the same UE. For example, as described herein, the CG-SDT response message may generally include a medium access control (MAC) layer control element mapped to a MAC sub-protocol data unit (subPDU), and an RRC message that is optionally multiplexed with the CG-SDT response message may be an upper-layer message (e.g., a core network message). In this way, by multiplexing an RRC message with the CG-SDT response message within the PDSCH, signaling overhead may be reduced by avoiding a need to transmit separate RRC signaling messages to the UE.

In some aspects, in cases where the CG-SDT response message or a portion of the CG-SDT response message is mapped to a PDSCH scheduled by the GC-PDCCH, the PDSCH may have a multicast configuration targeting multiple UEs or a unicast configuration targeting one particular UE. For example, as shown by reference number 540, a multicast PDSCH may include multiple CG-SDT response messages targeted to multiple UEs and each CG-SDT response message may optionally be multiplexed with an RRC message targeted to a corresponding UE. Accordingly, when the PDSCH has a multicast configuration, the multiple CG-SDT response messages targeting the multiple UEs may be multiplexed within the multicast PDSCH, and any optional RRC messages targeting certain UEs (if present) may be further multiplexed with the corresponding CG-SDT response message associated with the targeted UE(s). Additionally, or alternatively, as shown by reference number 550, a unicast PDSCH targeting a single UE may include a CG-SDT response message targeted to the corresponding UE, which may optionally be multiplexed with an RRC message targeted to the same UE.

In some aspects, as described above and as shown in FIG. 5, a CG-SDT response message may generally include a MAC subPDU that signals one or more communication parameters for one or more UEs. For example (e.g., as described in 3GPP Technical Specification 38.321, Section 6.1.2), a MAC protocol data unit (PDU) may generally include one or more MAC subPDUs, and each MAC sub-PDU may include a MAC subheader only (including optional padding bits), a MAC subheader and a MAC service data unit (SDU), a MAC subheader and a MAC control element (MAC-CE), or a MAC subheader and padding bits. In general, the MAC SDU and/or MAC subPDUs may have a variable size, and each MAC subheader may correspond to either a MAC SDU, a MAC-CE, or padding. In some aspects, the CG-SDT response message may generally be mapped to a MAC subPDU that includes one or more communication parameters targeted to one or more UEs, such as a timing advance command, a power control command, an uplink grant for retransmitting the payload of the CG-SDT transmission, a PUCCH and/or SRS resource indication or activation, configuration information for a wakeup signal and/or TRS, other communication parameters, and/or a subset thereof. Accordingly, a MAC subheader of the MAC subPDU may indicate a type of the CG-SDT response message (e.g., the combination of communication parameters signaled in the CG-SDT response message) and/or a payload size of the CG-SDT response message (e.g., to enable decoding of the CG-SDT response message). Furthermore, as shown in FIG. 5, when a CG-SDT response message is mapped to a multicast or unicast PDSCH and multiplexed with an optional RRC message, the RRC message may be mapped to a MAC SDU.

As indicated above, FIG. 5 is provided as an example. Other examples may differ from what is described with regard to FIG. 5.

Figure 6:
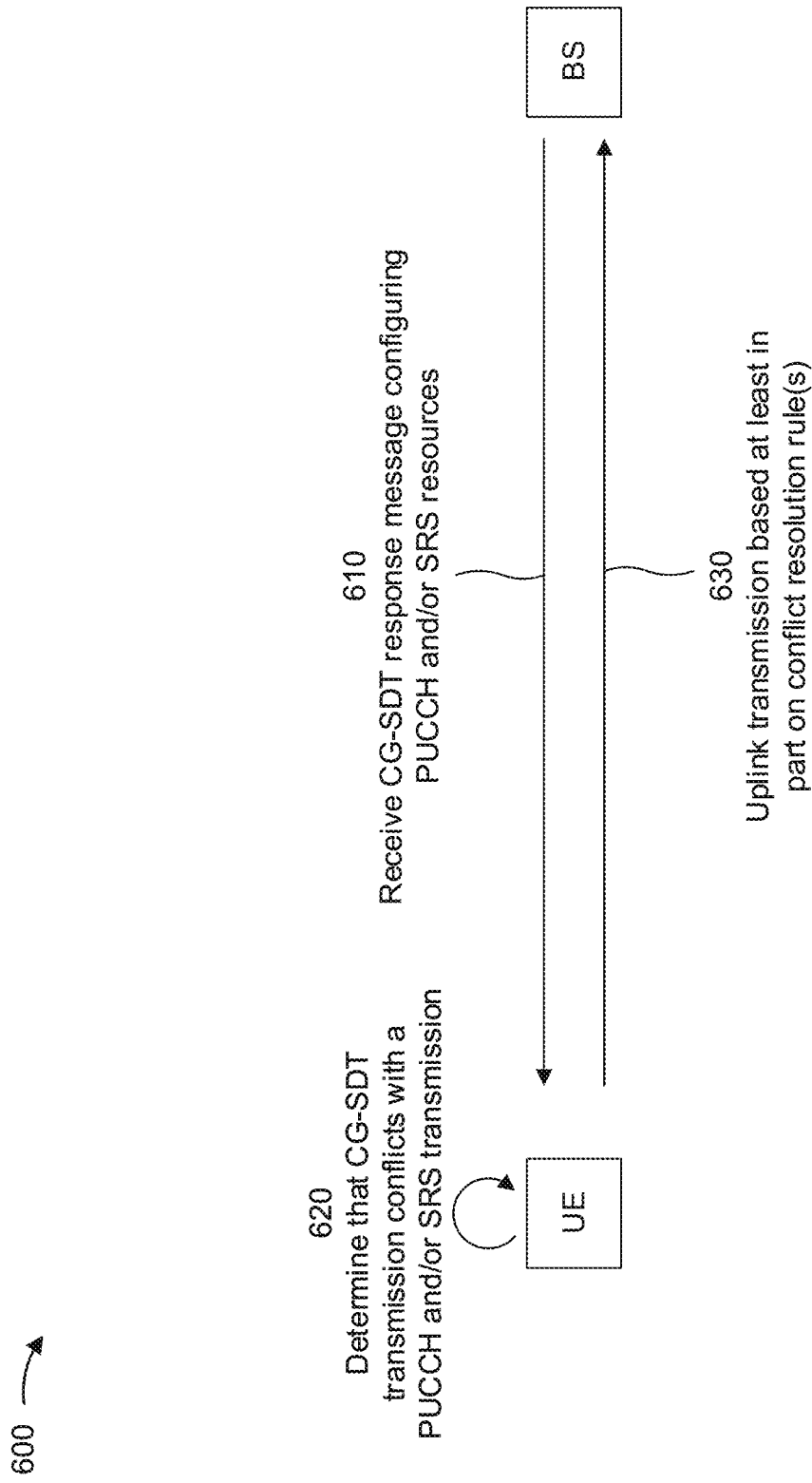

FIG. 6 is a diagram illustrating an example 600 associated with CG-SDT response transmission and uplink priority handling, in accordance with the present disclosure. As shown in FIG. 6, example 600 includes a base station (e.g., base station 110) that communicates with a UE in a wireless network (e.g., wireless network 100) via a wireless access link, which may include an uplink and a downlink. In some aspects, the base station may have configured the UE with a CG-SDT (e.g., while the UE was in an RRC connected mode, when transmitting an RRC release message to the UE, and/or the like) to enable the UE to transmit uplink data without a grant while in an inactive or idle mode. In some aspects, the UE may transmit the CG-SDT response in a CG-SDT occasion (e.g., a dedicated CG-SDT occasion configured for the UE, a shared CG-SDT occasion associated with a CG-SDT occasion group configured for a CG-SDT group that includes the UE, and/or the like). Furthermore, in some aspects, the base station may transmit, to the UE, a PDCCH that carries ACK/NACK feedback targeted to the UE. For example, the PDCCH may be a GC-PDCCH targeted to multiple UEs in a CG-SDT group that includes the UE, or may be targeted only to the UE. In either case, the PDCCH may include a CG-SDT feedback field that indicates an ACK or a NACK for the CG-SDT message transmitted by the UE. In cases where the CG-SDT feedback indicates an ACK for the CG-SDT message transmitted by the UE, the base station may further encode a CG-SDT response message in the PDCCH to signal one or more communication parameters to the UE and/or a downlink assignment to schedule a PDSCH that carries the CG-SDT response message or a portion thereof (e.g., a resource allocation in a time and/or frequency domain and/or a transport format to indicate a multicast or unicast PDSCH).

For example, as shown in FIG. 6, and by reference number 610, the base station may transmit, and the UE may receive, a CG-SDT response message that configures resources for a PUCCH transmission and/or resources for an SRS transmission. For example, in some aspects, the CG-SDT response message may configure resources for a PUCCH transmission and/or an SRS transmission in a time domain (e.g., certain symbols or slots), a frequency domain (e.g., covering certain resource elements and/or resource blocks), and/or a spatial domain (e.g., indicating a beam to be used for the PUCCH transmission and/or the SRS transmission). For example, in some aspects, the base station may configure PUCCH resources to enable the UE to transmit hybrid automatic repeat request (HARQ) feedback including ACK/NACK feedback from an optional RRC message that may be multiplexed with the CG-SDT response message. Additionally, or alternatively, the base station may configure SRS resources to enable the UE to transmit an SRS to assist with timing advance tracking, channel sounding, and/or positioning, among other examples. Accordingly, in example 600, the CG-SDT response message may generally enable the UE to transmit a PUCCH and/or an SRS using the resources configured in the CG-SDT response message in addition to a CG-SDT message that the UE is permitted to transmit in a next CG-SDT occasion.

As further shown in FIG. 6, and by reference number 620, the UE may determine that a CG-SDT transmission conflicts with a PUCCH transmission and/or an SRS transmission in an upcoming CG-SDT, PUCCH, and/or SRS occasion. For example, the UE may generally be permitted to transmit a CG-SDT in a CG-SDT occasion if the UE has a valid timing advance, and the UE may be further enabled to transmit a PUCCH and/or an SRS using the resources configured in the CG-SDT response message received from the base station. Accordingly, if the UE has a valid timing advance and is configured with CG-SDT, PUCCH, and SRS resources (or a subset thereof), the UE may transmit a CG-SDT, a PUCCH, or an SRS (or a subset thereof) in a corresponding transmission occasion. However, in cases where different uplink transmissions are associated with time and/or frequency resources that at least partially overlap (e.g., a CG-SDT and a PUCCH, a CG-SDT and an SRS, and/or a CG-SDT and a PUCCH and an SRS), the UE may apply one or more conflict resolution rules to handle the conflicting uplink transmissions.

For example, in some aspects, the UE may apply a priority-based rule to determine, among the conflicting uplink transmission, an uplink transmission that has a highest priority. For example, in some aspects, the priority-based rule may indicate that a PUCCH transmission has a highest priority, a CG-SDT message has a next highest priority, and an SRS transmission has a lowest priority. In this case, as shown by reference number 630, the UE may transmit, to the base station, the uplink transmission that has the highest priority, based at least in part on the priority-based rule. For example, when applying the priority-based rule, the UE may transmit a PUCCH if PUCCH resources are configured, may transmit an SRS only if PUCCH resources are not configured and the UE cannot transmit a CG-SDT message (e.g., because the timing advance for the UE is not valid), may transmit a CG-SDT message unless PUCCH resources are configured and/or the timing advance for the UE is not valid, and/or the like. Additionally, or alternatively, in cases where the UE has a valid timing advance and PUCCH resources (with a higher priority than a CG-SDT message) are configured, the UE may apply a multiplexing rule to multiplex uplink control information (UCI) onto the CG-SDT message. In this case, the UCI may correspond to a payload of the PUCCH, whereby the UE may transmit the CG-SDT message and the contents of the PUCCH in one transmission. For example, in some aspects, the UE may multiplex the UCI onto the CG-SDT message according to UCI piggybacking rules defined in one or more wireless communication standards (e.g., NR Rel-15).

As indicated above, FIG. 6 is provided as an example. Other examples may differ from what is described with regard to FIG. 6.

Figure 7:
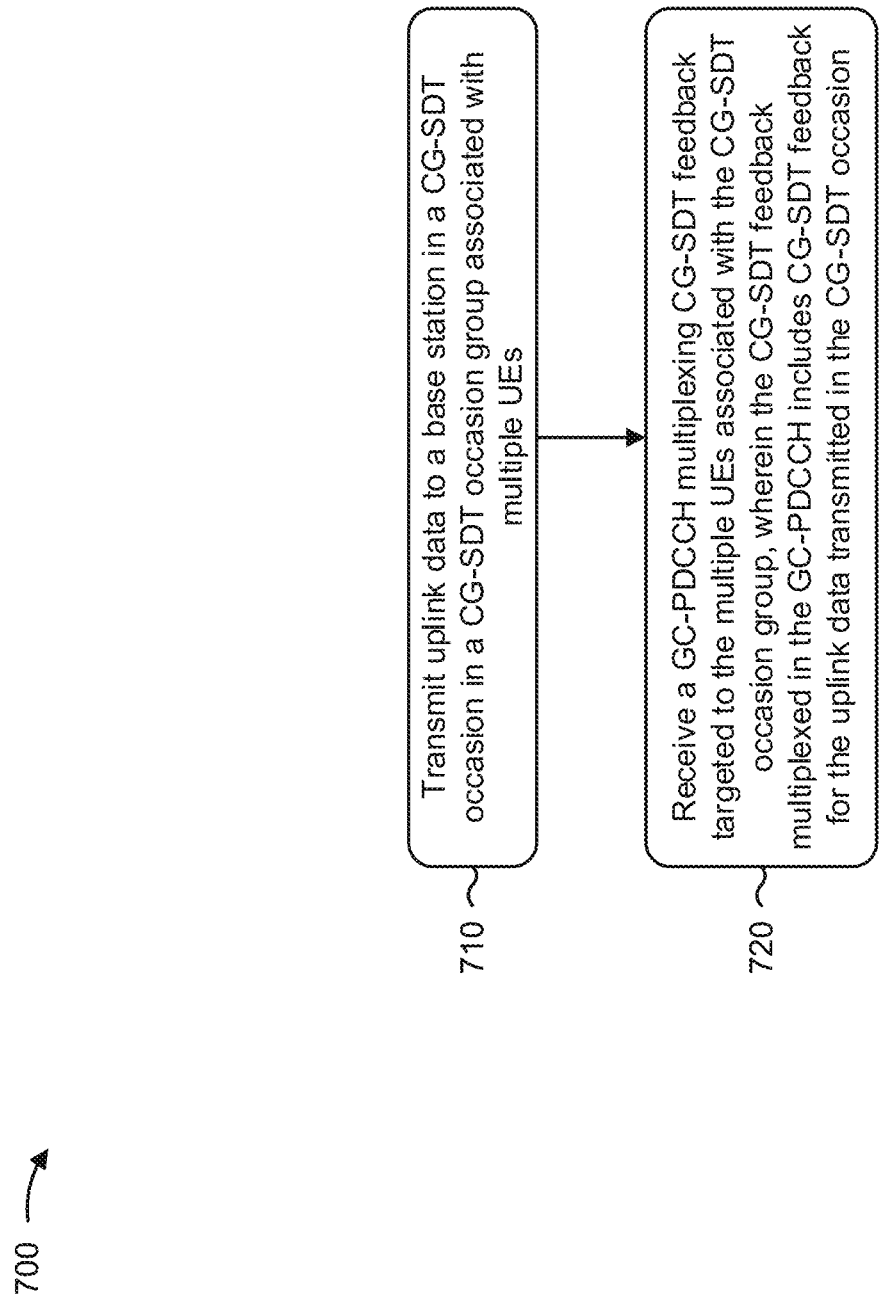
FIGS. 7-8 are diagrams illustrating example processes associated with CG-SDT response transmission and uplink priority handling, in accordance with the present disclosure.

FIG. 7 is a diagram illustrating an example process 700 performed, for example, by a UE, in accordance with the present disclosure. Example process 700 is an example where the UE (e.g., UE 120) performs operations associated with CG-SDT response transmission and uplink priority handling.

As shown in FIG. 7, in some aspects, process 700 may include transmitting uplink data to a base station in a CG-SDT occasion in a CG-SDT occasion group associated with multiple UEs (block 710). For example, the UE (e.g., using transmission component 904, depicted in FIG. 9) may transmit uplink data to a base station in a CG-SDT occasion in a CG-SDT occasion group associated with multiple UEs, as described above.

As further shown in FIG. 7, in some aspects, process 700 may include receiving a GC-PDCCH multiplexing CG-SDT feedback targeted to the multiple UEs associated with the CG-SDT occasion group, wherein the CG-SDT feedback multiplexed in the GC-PDCCH includes CG-SDT feedback for the uplink data transmitted in the CG-SDT occasion (block 720). For example, the UE (e.g., using reception component 902, depicted in FIG. 9) may receive a GC-PDCCH multiplexing CG-SDT feedback targeted to the multiple UEs associated with the CG-SDT occasion group, wherein the CG-SDT feedback multiplexed in the GC-PDCCH includes CG-SDT feedback for the uplink data transmitted in the CG-SDT occasion, as described above.

Process 700 may include additional aspects, such as any single aspect or any combination of aspects described below and/or in connection with one or more other processes described elsewhere herein.

In a first aspect, the GC-PDCCH includes a CRC scrambled by a RNTI shared by the multiple UEs associated with the CG-SDT occasion group.

In a second aspect, alone or in combination with the first aspect, process 700 includes decoding scheduling information included in the GC-PDCCH to determine a mapping to a CG-SDT response message based at least in part on the CG-SDT feedback including an ACK for the uplink data transmitted in the CG-SDT occasion, and receiving the CG-SDT response message based at least in part on the scheduling information and the mapping between the ACK and CG-SDT response message.

In a third aspect, alone or in combination with one or more of the first and second aspects, the CG-SDT response message includes a timing advance command, a power control command, an uplink grant for retransmitting a CG-SDT payload, an activation or a resource indication for a PUCCH or an SRS, configuration for a wakeup signal, or configuration information for a TRS.

In a fourth aspect, alone or in combination with one or more of the first through third aspects, at least a portion of the CG-SDT response message is mapped to the GC-PDCCH and multiplexed with the CG-SDT feedback.

In a fifth aspect, alone or in combination with one or more of the first through fourth aspects, at least a portion of the CG-SDT response message is mapped to a PDSCH based at least in part on the scheduling information included in the GC-PDCCH.

In a sixth aspect, alone or in combination with one or more of the first through fifth aspects, the scheduling information included in the GC-PDCCH indicates a resource allocation and a transport format associated with the PDSCH mapped to the CG-SDT response message.

In a seventh aspect, alone or in combination with one or more of the first through sixth aspects, the CG-SDT response message is multiplexed with an RRC message in the PDSCH scheduled by the GC-PDCCH.

In an eighth aspect, alone or in combination with one or more of the first through seventh aspects, the PDSCH has a unicast configuration scheduled by a dedicated grant.

In a ninth aspect, alone or in combination with one or more of the first through eighth aspects, the PDSCH has a multicast configuration in which the CG-SDT response message is multiplexed with one or more CG-SDT response messages for one or more other UEs associated with the CG-SDT occasion group.

In a tenth aspect, alone or in combination with one or more of the first through ninth aspects, the CG-SDT response message is mapped to a MAC subPDU.

In an eleventh aspect, alone or in combination with one or more of the first through tenth aspects, the MAC subPDU includes a MAC subheader that indicates a type or a size associated with the CG-SDT response message.

In a twelfth aspect, alone or in combination with one or more of the first through eleventh aspects, the CG-SDT response message further includes configuration information or an indication associated with one or more of a PUCCH resource or an SRS resource.

In a thirteenth aspect, alone or in combination with one or more of the first through twelfth aspects, process 700 includes determining that a CG-SDT transmission conflicts with one or more other uplink transmissions based at least in part on an overlap between a CG-SDT and one or more other uplink transmissions, wherein the one or more other uplink transmissions include a PUCCH transmission or an SRS transmission, determining, among the CG-SDT transmission and the one or more other uplink transmissions, an uplink transmission that has a highest priority, and transmitting the uplink transmission that has the highest priority.

In a fourteenth aspect, alone or in combination with one or more of the first through thirteenth aspects, the PUCCH transmission has a highest priority, the CG-SDT transmission has a next highest priority, and the SRS transmission has a lowest priority.

In a fifteenth aspect, alone or in combination with one or more of the first through fourteenth aspects, process 700 includes determining that a CG-SDT transmission and a PUCCH transmission conflict based at least in part on an overlap between a CG-SDT and the PUCCH resource, multiplexing the CG-SDT transmission with a UCI payload associated with the PUCCH, and transmitting the CG-SDT transmission with the multiplexed UCI payload.

In a sixteenth aspect, alone or in combination with one or more of the first through fifteenth aspects, the CG-SDT response message includes a first portion mapped to the GC-PDCCH and a second portion mapped to a PDSCH scheduled by the GC-PDCCH.

In a seventeenth aspect, alone or in combination with one or more of the first through sixteenth aspects, process 700 includes determining an occasion in which to retransmit the uplink data based at least in part on a timing advance validation and the CG-SDT feedback including a NACK for the uplink data transmitted in the CG-SDT occasion, and retransmitting the uplink data in the determined occasion with a valid timing advance.

In an eighteenth aspect, alone or in combination with one or more of the first through seventeenth aspects, the determined occasion is a CG-SDT occasion, a retransmission granted by the CG-SDT feedback, or a RACH occasion supporting early data transmission.

In a nineteenth aspect, alone or in combination with one or more of the first through eighteenth aspects, process 700 includes attempting the timing advance validation based at least in part on evaluating a timing advance timer and applying a timing advance command in the CG-SDT response message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
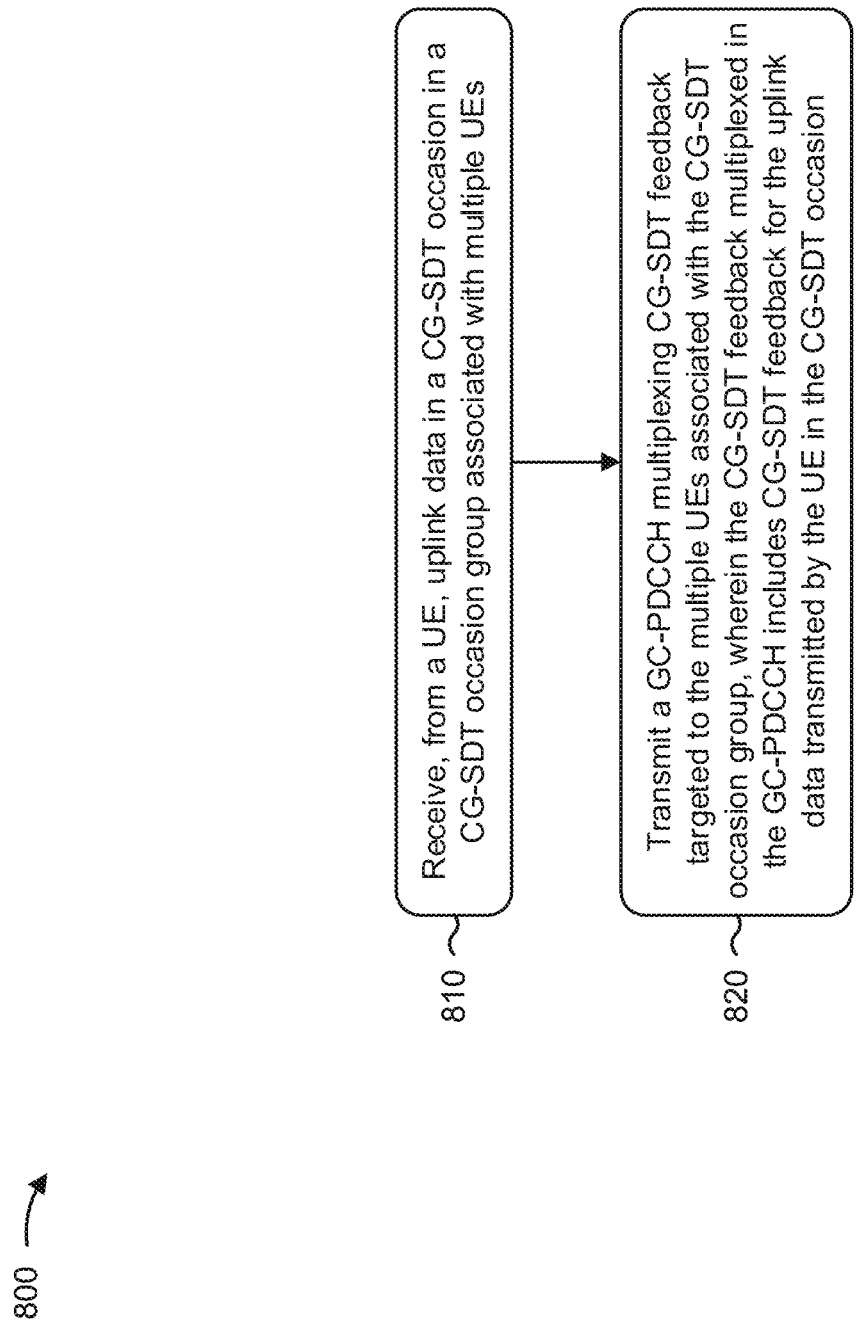

FIG. 8 is a diagram illustrating an example process 800 performed, for example, by a base station, in accordance with the present disclosure. Example process 800 is an example where the base station (e.g., base station 110) performs operations associated with CG-SDT response transmission and uplink priority handling.

As shown in FIG. 8, in some aspects, process 800 may include receiving, from a UE, uplink data in a CG-SDT occasion in a CG-SDT occasion group associated with multiple UEs (block 810). For example, the base station (e.g., using reception component 1002, depicted in FIG. 10) may receive, from a UE, uplink data in a CG-SDT occasion in a CG-SDT occasion group associated with multiple UEs, as described above.

As further shown in FIG. 8, in some aspects, process 800 may include transmitting a GC-PDCCH multiplexing CG-SDT feedback targeted to the multiple UEs associated with the CG-SDT occasion group, wherein the CG-PDCCH includes CG-SDT feedback multiplexed in the GC-PDCCH includes CG-SDT feedback for the uplink data transmitted by the UE in the CG-SDT occasion (block 820). For example, the base station (e.g., using transmission component 1004, depicted in FIG. 10) may transmit a GC-PDCCH multiplexing CG-SDT feedback targeted to the multiple UEs associated with the CG-SDT occasion group, wherein the CG-SDT feedback multiplexed in the GC-PDCCH includes CG-SDT feedback for the uplink data transmitted by the UE in the CG-SDT occasion, as described above.

Process 800 may include additional aspects, such as any single aspect or any combination of aspects described below and/or in connection with one or more other processes described elsewhere herein.

In a first aspect, the GC-PDCCH includes a CRC scrambled by a RNTI shared by the multiple UEs associated with the CG-SDT occasion group.

In a second aspect, alone or in combination with the first aspect, process 800 includes encoding scheduling information in the GC-PDCCH to indicate a mapping to a CG-SDT response message based at least in part on the CG-SDT feedback including an ACK for the uplink data transmitted in the CG-SDT occasion, and transmitting the CG-SDT response message based at least in part on the scheduling information and the mapping between the ACK and CG-SDT response message.

In a third aspect, alone or in combination with one or more of the first and second aspects, the CG-SDT response message includes a timing advance command, a power control command, an uplink resource indication for a PUCCH or an SRS, wakeup signal configuration information, or TRS configuration information.

In a fourth aspect, alone or in combination with one or more of the first through third aspects, at least a portion of the CG-SDT response message is mapped to the GC-PDCCH and multiplexed with the CG-SDT feedback targeted to the multiple UEs.

In a fifth aspect, alone or in combination with one or more of the first through fourth aspects, at least a portion of the CG-SDT response message is mapped to a PDSCH based at least in part on the scheduling information included in the GC-PDCCH.

In a sixth aspect, alone or in combination with one or more of the first through fifth aspects, the scheduling information included in the GC-PDCCH indicates a resource allocation and a transport format associated with the PDSCH mapped to the CG-SDT response message.

In a seventh aspect, alone or in combination with one or more of the first through sixth aspects, the CG-SDT response message is multiplexed with an RRC message in the PDSCH scheduled by the GC-PDCCH.

In an eighth aspect, alone or in combination with one or more of the first through seventh aspects, the PDSCH has a unicast configuration.

In a ninth aspect, alone or in combination with one or more of the first through eighth aspects, the PDSCH has a multicast configuration in which the CG-SDT response message is multiplexed with one or more CG-SDT response messages for one or more other UEs associated with the CG-SDT occasion group.

In a tenth aspect, alone or in combination with one or more of the first through ninth aspects, the CG-SDT response message is mapped to a MAC subPDU, In an eleventh aspect, alone or in combination with one or more of the first through tenth aspects, the MAC subPDU includes a MAC subheader that indicates a type or a size associated with the CG-SDT response message.

In a twelfth aspect, alone or in combination with one or more of the first through eleventh aspects, the CG-SDT response message further includes configuration information associated with one or more of a PUCCH resource or an SRS resource.

In a thirteenth aspect, alone or in combination with one or more of the first through twelfth aspects, process 800 includes determining that a CG-SDT transmission conflicts with one or more other uplink transmissions based at least in part on an overlap between a CG-SDT and one or more of the PUCCH resource or the SRS resource, wherein the one or more other uplink transmissions include a PUCCH transmission or an SRS transmission, determining, among the CG-SDT transmission and the one or more other uplink transmissions, an uplink transmission that has a highest priority, and receiving, from the UE, the uplink transmission that has the highest priority.

In a fourteenth aspect, alone or in combination with one or more of the first through thirteenth aspects, the PUCCH transmission has a highest priority, the CG-SDT transmission has a next highest priority, and the SRS transmission has a lowest priority.

In a fifteenth aspect, alone or in combination with one or more of the first through fourteenth aspects, process 800 includes determining that a CG-SDT transmission and a PUCCH transmission conflict based at least in part on an overlap between a CG-SDT and the PUCCH resource, and receiving, from the UE, the CG-SDT transmission multiplexed with a UCI payload associated with the PUCCH.

In a sixteenth aspect, alone or in combination with one or more of the first through fifteenth aspects, the CG-SDT response message includes a first portion mapped to the GC-PDCCH and a second portion mapped to a PDSCH scheduled by the GC-PDCCH.

In a seventeenth aspect, alone or in combination with one or more of the first through sixteenth aspects, process 800 includes determining an occasion in which the UE is to retransmit the uplink data based at least in part on a timing advance validation and the CG-SDT feedback including a NACK for the uplink data transmitted in the CG-SDT occasion, and receiving, from the UE, a retransmission of the uplink data in the determined occasion based at least in part on the CG-SDT feedback including the NACK for the uplink data transmitted in the CG-SDT occasion.

In an eighteenth aspect, alone or in combination with one or more of the first through seventeenth aspects, the determined occasion is a RACH occasion supporting early data transmission.

In a nineteenth aspect, alone or in combination with one or more of the first through eighteenth aspects, the determined occasion is a next CG-SDT occasion in the CG-SDT occasion group.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
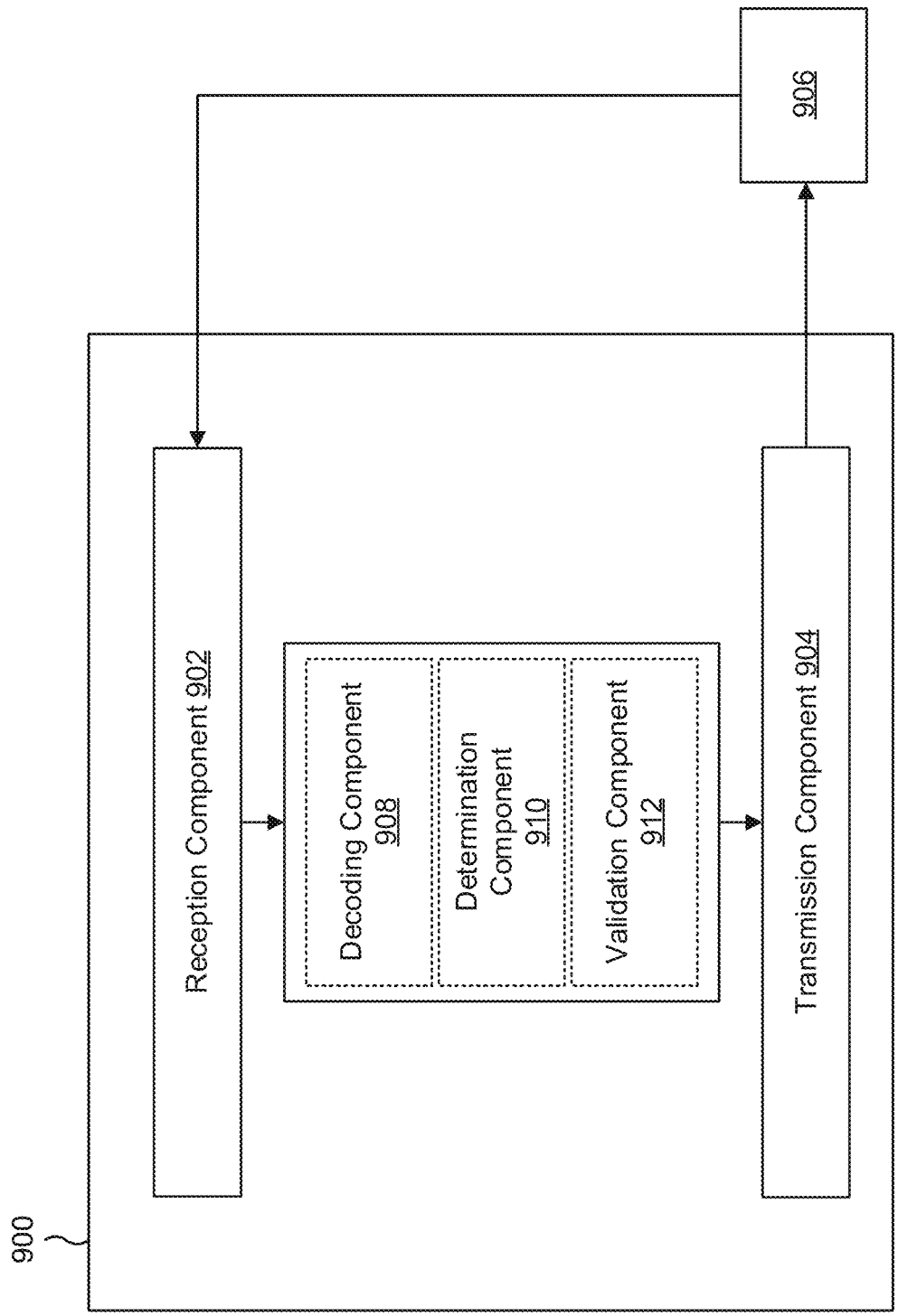
FIGS. 9-10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a decoding component 908, a determination component 910, or a validation component 912, among other examples.

In some aspects, the apparatus 900 may be configured to perform one or more operations described herein in connection with FIGS. 3-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The transmission component 904 may transmit uplink data to a base station in a CG-SDT occasion in a CG-SDT occasion group associated with multiple UEs. The reception component 902 may receive a GC-PDCCH multiplexing CG-SDT feedback targeted to the multiple UEs associated with the CG-SDT occasion group, wherein the CG-SDT feedback multiplexed in the GC-PDCCH includes CG-SDT feedback for the uplink data transmitted in the CG-SDT occasion.

The decoding component 908 may decode scheduling information included in the GC-PDCCH to determine a mapping to a CG-SDT response message based at least in part on the CG-SDT feedback including an ACK for the uplink data transmitted in the CG-SDT occasion. In some aspects, the decoding component 908 may include one or more antennas, a demodulator, a MIMO detector, a receive processor, a controller/processor, a memory, or a combination thereof, of the UE described above in connection with FIG. 2. The reception component 902 may receive the CG-SDT response message based at least in part on the scheduling information and the mapping between the ACK and CG-SDT response message.

The determination component 910 may determine that a CG-SDT transmission conflicts with one or more other uplink transmissions based at least in part on an overlap between a CG-SDT and one or more other uplink transmissions, wherein the one or more other uplink transmissions include a PUCCH transmission or an SRS transmission. In some aspects, the determination component 910 may include a controller/processor, a memory, or a combination thereof, of the UE described above in connection with FIG. 2. The determination component 910 may determine, among the CG-SDT transmission and the one or more other uplink transmissions, an uplink transmission that has a highest priority. The transmission component 904 may transmit the uplink transmission that has the highest priority.

The determination component 910 may determine that a CG-SDT transmission and a PUCCH transmission conflict based at least in part on an overlap between a CG-SDT and the PUCCH resource. The transmission component 904 may multiplex the CG-SDT transmission with a UCI payload associated with the PUCCH. The transmission component 904 may transmit the CG-SDT transmission with the multiplexed UCI payload.

The determination component 910 may determine an occasion in which to retransmit the uplink data based at least in part on a timing advance validation and the CG-SDT feedback including a NACK for the uplink data transmitted in the CG-SDT occasion. The transmission component 904 may retransmit the uplink data in the determined occasion with a valid timing advance.

The validation component 912 may attempt the timing advance validation based at least in part on evaluating a timing advance timer and applying a timing advance command in the CG-SDT response message. In some aspects, the validation component 912 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
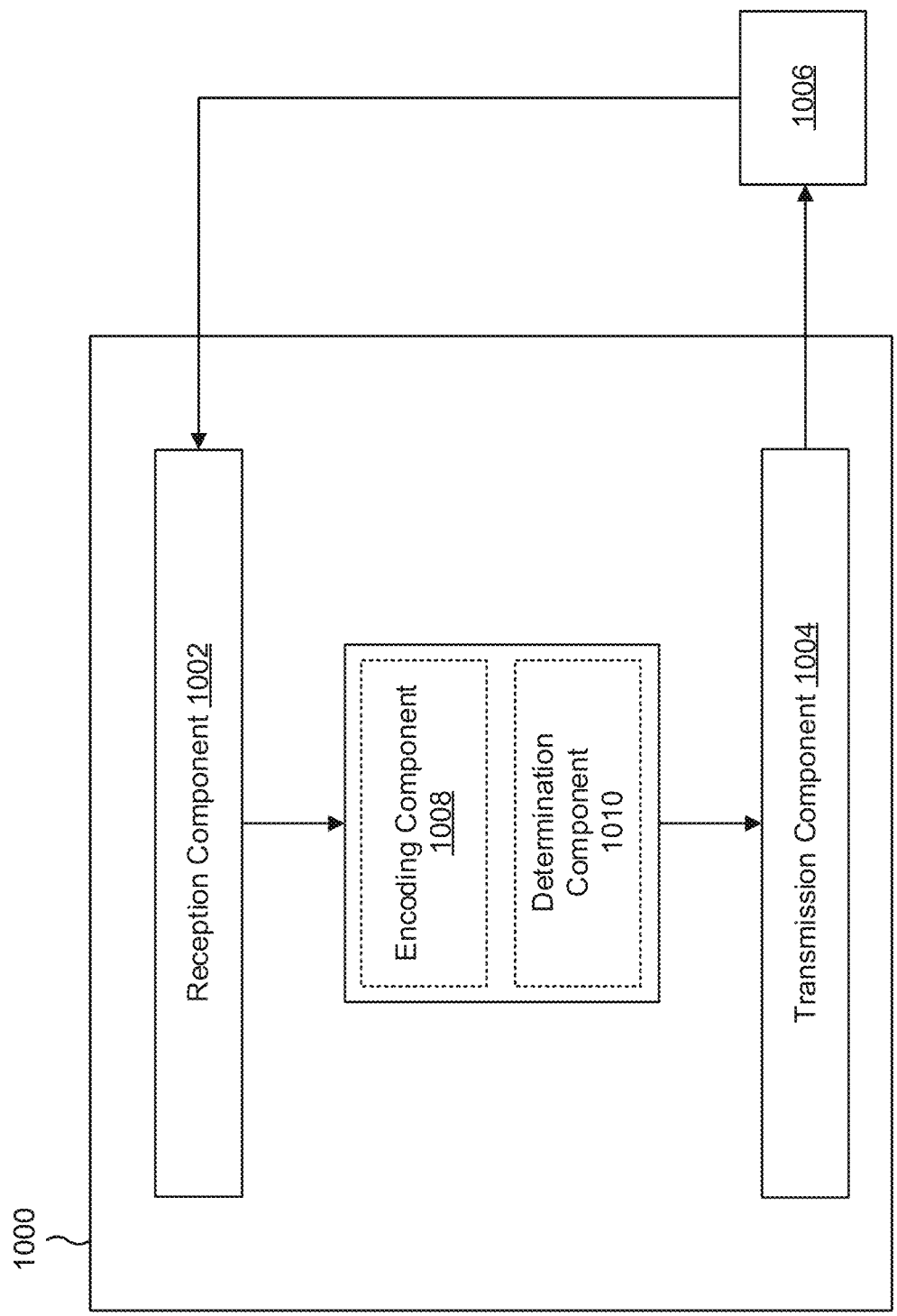

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of an encoding component 1008 or a determination component 1010, among other examples.

In some aspects, the apparatus 1000 may be configured to perform one or more operations described herein in connection with FIGS. 3-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The reception component 1002 may receive, from a UE, uplink data in a CG-SDT occasion in a CG-SDT occasion group associated with multiple UEs. The transmission component 1004 may transmit a GC-PDCCH multiplexing CG-SDT feedback targeted to the multiple UEs associated with the CG-SDT occasion group, wherein the CG-SDT feedback multiplexed in the GC-PDCCH includes CG-SDT feedback for the uplink data transmitted by the UE in the CG-SDT occasion.

The encoding component 1008 may encode scheduling information in the GC-PDCCH to indicate a mapping to a CG-SDT response message based at least in part on the CG-SDT feedback including an ACK for the uplink data transmitted in the CG-SDT occasion. In some aspects, the encoding component 1008 may include one or more antennas, a modulator, a transmit MIMO processor, a transmit processor, a controller/processor, a memory, or a combination thereof, of the base station described above in connection with FIG. 2. The transmission component 1004 may transmit the CG-SDT response message based at least in part on the scheduling information and the mapping between the ACK and CG-SDT response message.

The determination component 1010 may determine that a CG-SDT transmission conflicts with one or more other uplink transmissions based at least in part on an overlap between a CG-SDT and one or more of the PUCCH resource or the SRS resource, wherein the one or more other uplink transmissions include a PUCCH transmission or an SRS transmission. In some aspects, the determination component 1010 may include a controller/processor, a memory, or a combination thereof, of the base station described above in connection with FIG. 2. The determination component 1010 may determine, among the CG-SDT transmission and the one or more other uplink transmissions, an uplink transmission that has a highest priority. The reception component 1002 may receive, from the UE, the uplink transmission that has the highest priority.

The determination component 1010 may determine that a CG-SDT transmission and a PUCCH transmission conflict based at least in part on an overlap between a CG-SDT and the PUCCH resource. The reception component 1002 may receive, from the UE, the CG-SDT transmission multiplexed with a UCI payload associated with the PUCCH.

The determination component 1010 may determine an occasion in which the UE is to retransmit the uplink data based at least in part on a timing advance validation and the CG-SDT feedback including a NACK for the uplink data transmitted in the CG-SDT occasion. The reception component 1002 may receive, from the UE, a retransmission of the uplink data in the determined occasion based at least in part on the CG-SDT feedback including the NACK for the uplink data transmitted in the CG-SDT occasion.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: transmitting uplink data to a base station in a CG-SDT occasion in a CG-SDT occasion group associated with multiple UEs; and receiving a GC-PDCCH multiplexing CG-SDT feedback targeted to the multiple UEs associated with the CG-SDT occasion group, wherein the CG-SDT feedback multiplexed in the GC-PDCCH includes CG-SDT feedback for the uplink data transmitted in the CG-SDT occasion.

Aspect 2: The method of Aspect 1, wherein the GC-PDCCH includes a CRC scrambled by a RNTI shared by the multiple UEs associated with the CG-SDT occasion group.

Aspect 3: The method of any of Aspects 1-2, further comprising: decoding scheduling information included in the GC-PDCCH to determine a mapping to a CG-SDT response message based at least in part on the CG-SDT feedback including an ACK for the uplink data transmitted in the CG-SDT occasion; and receiving the CG-SDT response message based at least in part on the scheduling information and the mapping between the ACK and the CG-SDT response message.

Aspect 4: The method of Aspect 3, wherein the CG-SDT response message includes a timing advance command, a power control command, an uplink grant for retransmitting a CG-SDT payload, an activation or a resource indication for a PUCCH or an SRS, configuration for a wakeup signal, or configuration information for a TRS.

Aspect 5: The method of any of Aspects 3-4, wherein at least a portion of the CG-SDT response message is mapped to the GC-PDCCH and multiplexed with the CG-SDT feedback.

Aspect 6: The method of any of Aspects 3-5, wherein at least a portion of the CG-SDT response message is mapped to a PDSCH based at least in part on the scheduling information included in the GC-PDCCH.

Aspect 7: The method of Aspect 6, wherein the scheduling information included in the GC-PDCCH indicates a resource allocation and a transport format associated with the PDSCH mapped to the CG-SDT response message.

Aspect 8: The method of any of Aspects 6-7, wherein the CG-SDT response message is multiplexed with an RRC message in the PDSCH scheduled by the GC-PDCCH.

Aspect 9: The method of any of Aspects 6-9, wherein the PDSCH has a unicast configuration scheduled by a dedicated grant.

Aspect 10: The method of any of Aspects 6-9, wherein the PDSCH has a multicast configuration in which the CG-SDT response message is multiplexed with one or more CG-SDT response messages for one or more other UEs associated with the CG-SDT occasion group.

Aspect 11: The method of any of Aspects 3-10, wherein the CG-SDT response message is mapped to a MAC sub-PDU.

Aspect 12: The method of Aspect 11, wherein the MAC subPDU includes a MAC subheader that indicates a type or a size associated with the CG-SDT response message.

Aspect 13: The method of any of Aspects 3-12, wherein the CG-SDT response message further includes configuration information or an indication associated with one or more of a PUCCH resource or an SRS resource.

Aspect 14: The method of Aspect 13, further comprising: determining that a CG-SDT transmission conflicts with one or more other uplink transmissions based at least in part on an overlap between a CG-SDT and one or more other uplink transmissions, wherein the one or more other uplink transmissions include a PUCCH transmission or an SRS transmission; determining, among the CG-SDT transmission and the one or more other uplink transmissions, an uplink transmission that has a highest priority; and transmitting the uplink transmission that has the highest priority.

Aspect 15: The method of Aspect 14, wherein the PUCCH transmission has a highest priority, the CG-SDT transmission has a next highest priority, and the SRS transmission has a lowest priority.

Aspect 16: The method of any of Aspects 13-15, further comprising: determining that a CG-SDT transmission and a PUCCH transmission conflict based at least in part on an overlap between a CG-SDT and the PUCCH resource; multiplexing the CG-SDT transmission with an uplink control information (UCI) payload associated with the PUCCH; and transmitting the CG-SDT transmission with the multiplexed UCI payload.

Aspect 17: The method of any of Aspects 3-16, wherein the CG-SDT response message includes a first portion mapped to the GC-PDCCH and a second portion mapped to a PDSCH scheduled by the GC-PDCCH.

Aspect 18: The method of any of Aspects 1-17, further comprising: determining an occasion in which to retransmit the uplink data based at least in part on a timing advance validation and the CG-SDT feedback including a NACK for the uplink data transmitted in the CG-SDT occasion; and retransmitting the uplink data in the determined occasion with a valid timing advance.

Aspect 19: The method of Aspect 18, wherein the determined occasion is a CG-SDT occasion, a retransmission granted by the CG-SDT feedback, or a RACH occasion supporting early data transmission if the timing advance validation fails or the CG-SDT occasion is cancelled by another transmission having a higher priority.

Aspect 20: The method of any of Aspects 18-19, further comprising: attempting the timing advance validation based at least in part on evaluating a timing advance timer and applying a timing advance command in the CG-SDT response message.

Aspect 21: A method of wireless communication performed by a base station, comprising: receiving, from a UE, uplink data in a CG-SDT occasion in a CG-SDT occasion group associated with multiple UEs; and transmitting a GC-PDCCH multiplexing CG-SDT feedback targeted to the multiple UEs associated with the CG-SDT occasion group, wherein the CG-SDT feedback multiplexed in the GC-PDCCH includes CG-SDT feedback for the uplink data transmitted by the UE in the CG-SDT occasion.

Aspect 22: The method of Aspect 21, wherein the GC-PDCCH includes a cyclic redundancy check scrambled by an RNTI shared by the multiple UEs associated with the CG-SDT occasion group.

Aspect 23: The method of any of Aspects 21-22, further comprising: encoding scheduling information in the GC-PDCCH to indicate a mapping to a CG-SDT response message based at least in part on the CG-SDT feedback including an ACK for the uplink data transmitted in the CG-SDT occasion; and transmitting the CG-SDT response message based at least in part on the scheduling information and the mapping between the ACK and the CG-SDT response message.

Aspect 24: The method of Aspect 23, wherein the CG-SDT response message includes a timing advance command, a power control command, an uplink resource indication for a physical uplink control channel or a sounding reference signal, wakeup signal configuration information, or TRS configuration information.

Aspect 25: The method of any of Aspects 23-24, wherein at least a portion of the CG-SDT response message is mapped to the GC-PDCCH and multiplexed with the CG-SDT feedback targeted to the multiple UEs.

Aspect 26: The method of any of Aspects 23-25, wherein at least a portion of the CG-SDT response message is mapped to a PDSCH based at least in part on the scheduling information included in the GC-PDCCH.

Aspect 27: The method of Aspect 26, wherein the scheduling information included in the GC-PDCCH indicates a resource allocation and a transport format associated with the PDSCH mapped to the CG-SDT response message.

Aspect 28: The method of any of Aspects 26-27, wherein the CG-SDT response message is multiplexed with an RRC message in the PDSCH scheduled by the GC-PDCCH.

Aspect 29: The method of any of Aspects 26-28, wherein the PDSCH has a unicast configuration.

Aspect 30: The method of any of Aspects 26-28, wherein the PDSCH has a multicast configuration in which the CG-SDT response message is multiplexed with one or more CG-SDT response messages for one or more other UEs associated with the CG-SDT occasion group.

Aspect 31: The method of any of Aspects 23-30, wherein the CG-SDT response message is mapped to a MAC sub-PDU.

Aspect 32: The method of Aspect 31, wherein the MAC subPDU includes a MAC subheader that indicates a type or a size associated with the CG-SDT response message.

Aspect 33: The method of any of Aspects 23-32, wherein the CG-SDT response message further includes configuration information associated with one or more of a PUCCH resource or an SRS resource.

Aspect 34: The method of Aspect 33, further comprising: determining that a CG-SDT transmission conflicts with one or more other uplink transmissions based at least in part on an overlap between a CG-SDT and one or more of the PUCCH resource or the SRS resource, wherein the one or more other uplink transmissions include a PUCCH transmission or an SRS transmission; determining, among the CG-SDT transmission and the one or more other uplink transmissions, an uplink transmission that has a highest priority; and receiving, from the UE, the uplink transmission that has the highest priority.

Aspect 35: The method of Aspect 34, wherein the PUCCH transmission has a highest priority, the CG-SDT transmission has a next highest priority, and the SRS transmission has a lowest priority.

Aspect 36: The method of any of Aspects 33-35, further comprising: determining that a CG-SDT transmission and a PUCCH transmission conflict based at least in part on an overlap between a CG-SDT and the PUCCH resource; and receiving, from the UE, the CG-SDT transmission multiplexed with a UCI payload associated with the PUCCH.

Aspect 37: The method of any of Aspects 23-36, wherein the CG-SDT response message includes a first portion mapped to the GC-PDCCH and a second portion mapped to a PDSCH scheduled by the GC-PDCCH.

Aspect 38: The method of any of Aspects 21-37, further comprising: determining an occasion in which the UE is to retransmit the uplink data based at least in part on a timing advance validation and the CG-SDT feedback including a NACK for the uplink data transmitted in the CG-SDT occasion; and receiving, from the UE, a retransmission of the uplink data in the determined occasion based at least in part on the CG-SDT feedback including the NACK for the uplink data transmitted in the CG-SDT occasion.

Aspect 39: The method of Aspect 38, wherein the determined occasion is a RACH occasion supporting early data transmission.

Aspect 40: The method of any of Aspects 38-39, wherein the determined occasion is a next CG-SDT occasion in the CG-SDT occasion group.

Aspect 41: An apparatus for wireless communication at a device, comprising a processor; memory coupled with the processor; and instructions stored in the memory and executable by the processor to cause the apparatus to perform the method of one or more of Aspects 1-20.

Aspect 42: A device for wireless communication, comprising a memory and one or more processors coupled to the memory, the one or more processors configured to perform the method of one or more of Aspects 1-20.

Aspect 43: An apparatus for wireless communication, comprising at least one means for performing the method of one or more of Aspects 1-20.

Aspect 44: A non-transitory computer-readable medium storing code for wireless communication, the code comprising instructions executable by a processor to perform the method of one or more of Aspects 1-20.

Aspect 45: A non-transitory computer-readable medium storing a set of instructions for wireless communication, the set of instructions comprising one or more instructions that, when executed by one or more processors of a device, cause the device to perform the method of one or more of Aspects 1-20.

Aspect 46: An apparatus for wireless communication at a device, comprising a processor; memory coupled with the processor; and instructions stored in the memory and executable by the processor to cause the apparatus to perform the method of one or more of Aspects 21-40.

Aspect 47: A device for wireless communication, comprising a memory and one or more processors coupled to the memory, the one or more processors configured to perform the method of one or more of Aspects 21-40.

Aspect 48: An apparatus for wireless communication, comprising at least one means for performing the method of one or more of Aspects 21-40.

Aspect 49: A non-transitory computer-readable medium storing code for wireless communication, the code comprising instructions executable by a processor to perform the method of one or more of Aspects 21-40.

Aspect 50: A non-transitory computer-readable medium storing a set of instructions for wireless communication, the set of instructions comprising one or more instructions that, when executed by one or more processors of a device, cause the device to perform the method of one or more of Aspects 21-40.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting uplink data to a base station in a configured grant small data transfer (CG-SDT) occasion;
   receiving a physical downlink control channel (PDCCH) comprising CG-SDT feedback targeted to the UE, wherein the CG-SDT feedback includes CG-SDT feedback for the uplink data transmitted in the CG-SDT occasion; and
   decoding scheduling information included in the PDCCH to determine a mapping to a CG-SDT response message based at least in part on the CG-SDT feedback including an acknowledgement (ACK) for the uplink data transmitted in the CG-SDT occasion.

2. The method of claim 1, wherein the PDCCH includes a cyclic redundancy check scrambled by a radio network temporary identity (RNTI).

3. The method of claim 1, further comprising:
receiving the CG-SDT response message based at least in part on the scheduling information and the mapping between the ACK and the CG-SDT response message.

4. The method of claim 1, wherein the CG-SDT response message includes a timing advance command, a power control command, an uplink grant for retransmitting a CG-SDT payload, an activation or a resource indication for a physical uplink control channel (PUCCH) or a sounding reference signal (SRS), configuration for a wakeup signal, or configuration information for a tracking reference signal (TRS).

5. The method of claim 1, wherein at least a portion of the CG-SDT response message is mapped to the PDCCH and multiplexed with the CG-SDT feedback.

6. The method of claim 1, wherein at least a portion of the CG-SDT response message is mapped to a physical downlink shared channel (PDSCH) based at least in part on the scheduling information included in the PDCCH.

7. The method of claim 6, wherein the CG-SDT response message is multiplexed with a radio resource control (RRC) message in the PDSCH scheduled by the PDCCH, and wherein the PDSCH has a unicast configuration scheduled by a dedicated grant or a multicast configuration in which the CG-SDT response message is multiplexed with one or more CG-SDT response messages for one or more other UEs associated with a CG-SDT occasion group.

8. The method of claim 1, wherein the CG-SDT response message is mapped to a medium access control (MAC) sub protocol data unit (MAC subPDU) that includes a MAC subheader that indicates a type or a size associated with the CG-SDT response message.

9. The method of claim 1, wherein the CG-SDT response message further includes configuration information or an indication associated with one or more of a physical uplink control channel (PUCCH) resource or a sounding reference signal (SRS) resource.

10. The method of claim 9, further comprising:
determining that a CG-SDT transmission conflicts with one or more other uplink transmissions based at least in part on an overlap between the CG-SDT transmission and one or more other uplink transmissions, wherein the one or more other uplink transmissions include a PUCCH transmission or an SRS transmission;
determining, among the CG-SDT transmission and the one or more other uplink transmissions, an uplink transmission that has a highest priority; and
transmitting the uplink transmission that has the highest priority.

11. The method of claim 10, wherein the PUCCH transmission has a highest priority, the CG-SDT transmission has a next highest priority, and the SRS transmission has a lowest priority.

12. The method of claim 9, further comprising:
determining that a CG-SDT transmission and a PUCCH transmission conflict based at least in part on an overlap between the CG-SDT transmission and the PUCCH resource;
multiplexing the CG-SDT transmission with an uplink control information (UCI) payload associated with the PUCCH resource; and
transmitting the CG-SDT transmission with the UCI payload.

13. The method of claim 1, wherein the CG-SDT response message includes a first portion mapped to the PDCCH and a second portion mapped to a physical downlink shared channel (PDSCH) scheduled by the PDCCH.

14. A method of wireless communication performed by a base station, comprising:
receiving, from a user equipment (UE), uplink data in a configured grant small data transfer (CG-SDT) occasion;
encoding, in a physical downlink control channel (PDCCH), CG-SDT feedback targeted to the UE and scheduling information to indicate a mapping to a CG-SDT response message based at least in part on the CG-SDT feedback including an acknowledgement (ACK) for the uplink data transmitted by the UE in the CG-SDT occasion; and
transmitting the PDCCH.

15. The method of claim 14, wherein the PDCCH includes a cyclic redundancy check scrambled by a radio network temporary identity (RNTI).

16. The method of claim 14, further comprising:
transmitting the CG-SDT response message based at least in part on the scheduling information and the mapping between the ACK and the CG-SDT response message.

17. The method of claim 14, wherein at least a portion of the CG-SDT response message is mapped to the PDCCH and multiplexed with the CG-SDT feedback.

18. The method of claim 14, wherein at least a portion of the CG-SDT response message is mapped to a physical downlink shared channel (PDSCH) based at least in part on the scheduling information included in the PDCCH.

19. The method of claim 18, wherein the CG-SDT response message is multiplexed with a radio resource control message in the PDSCH scheduled by the PDCCH, and wherein the PDSCH has a unicast configuration or a multicast configuration in which the CG-SDT response message is multiplexed with one or more CG-SDT response messages for one or more other UEs associated with a CG-SDT occasion group.

20. The method of claim 14, wherein the CG-SDT response message is mapped to a medium access control (MAC) sub protocol data unit (MAC subPDU) that includes a MAC subheader that indicates a type or a size associated with the CG-SDT response message.

21. The method of claim 14, wherein the CG-SDT response message further includes configuration information associated with one or more of a physical uplink control channel (PUCCH) resource or a sounding reference signal (SRS) resource.

22. The method of claim 21, further comprising:
determining that a CG-SDT transmission conflicts with one or more other uplink transmissions based at least in part on an overlap between the CG-SDT transmission and one or more of the PUCCH resource or the SRS resource, wherein the one or more other uplink transmissions include a PUCCH transmission or an SRS transmission;
determining, among the CG-SDT transmission and the one or more other uplink transmissions, an uplink transmission that has a highest priority; and
receiving, from the UE, the uplink transmission that has the highest priority.

23. The method of claim 21, further comprising:
- determining that a CG-SDT transmission and a PUCCH transmission conflict based at least in part on an overlap between the CG-SDT transmission and the PUCCH resource; and
- receiving, from the UE, the CG-SDT transmission multiplexed with an uplink control information payload associated with the PUCCH transmission.

24. The method of claim 14, wherein the CG-SDT response message includes a first portion mapped to the PDCCH and a second portion mapped to a physical downlink shared channel (PDSCH) scheduled by the PDCCH.

* * * * *